US012717205B2

(12) United States Patent
Zou et al.

(10) Patent No.: US 12,717,205 B2
(45) Date of Patent: Aug. 25, 2026

(54) DISPLAY SUBSTRATE, DISPLAY DEVICE AND MANUFACTURING METHOD

(71) Applicants: Beijing BOE Optoelectronics Technology Co., Ltd., Beijing (CN); BOE Technology Group Co., Ltd., Beijing (CN)

(72) Inventors: Haowei Zou, Beijing (CN); Hao Yan, Beijing (CN); Hanqing Liu, Beijing (CN); Pengcheng Tian, Beijing (CN); Wei Chen, Beijing (CN); Hongwen Guo, Beijing (CN); Yuxuan Wei, Beijing (CN); Xin Li, Beijing (CN); Yong Song, Beijing (CN); Xiang Li, Beijing (CN); Wei He, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 273 days.

(21) Appl. No.: 18/712,224

(22) PCT Filed: Apr. 18, 2023

(86) PCT No.: PCT/CN2023/088877

§ 371 (c)(1),
(2) Date: May 21, 2024

(87) PCT Pub. No.: WO2023/226626

PCT Pub. Date: Nov. 30, 2023

(65) Prior Publication Data

US 2025/0004344 A1 Jan. 2, 2025

(30) Foreign Application Priority Data

May 27, 2022 (CN) ........................ 202210593333.4

(51) Int. Cl.
*G02F 1/1675* (2019.01)
*G02F 1/167* (2019.01)
(Continued)

(52) U.S. Cl.
CPC .......... *G02F 1/16766* (2019.01); *G02F 1/167* (2013.01); *G02F 1/16756* (2019.01)

(58) Field of Classification Search
CPC ....... G02F 1/167; G02F 1/1675; G02F 1/1676
See application file for complete search history.

(56) References Cited

U.S. PATENT DOCUMENTS

2009/0091816 A1* 4/2009 Kim ................. G02F 1/133377 359/296

FOREIGN PATENT DOCUMENTS

CN 1904977 A 1/2007
CN 108598118 A 9/2018
(Continued)

*Primary Examiner* — Joseph P Martinez
(74) *Attorney, Agent, or Firm* — IPro, PLLC

(57) ABSTRACT

Disclosed are a display substrate, a display device, and a manufacturing method. The display substrate includes: a base substrate; gate lines and data lines which define a plurality of sub-pixel regions; sub-pixel electrodes located in the plurality of sub-pixel regions on the base substrate; driving transistors disposed on the base substrate and electrically connected with the data lines, the gate lines and the sub-pixel electrodes; and a bar structure on a side of a layer where the sub-pixel electrodes are located away from the base substrate. The bar structure has an opening region for accommodating charged particles in each sub-pixel region, an orthographic projection of the bar structure at least partially covers orthographic projections of the gate lines and the data lines on the base substrate, and a ratio of an area of a sub-pixel electrode to an area of a sub-pixel region is greater than 70%.

16 Claims, 15 Drawing Sheets

(51) Int. Cl.
*G02F 1/16756* (2019.01)
*G02F 1/16766* (2019.01)

(56) References Cited

FOREIGN PATENT DOCUMENTS

| | | | |
|---|---|---|---|
| CN | 110164373 | A | 8/2019 |
| CN | 110459561 | A | 11/2019 |
| CN | 111474800 | A | 7/2020 |
| CN | 113777847 | A | 12/2021 |
| CN | 114967269 | A | 8/2022 |
| KR | 20130021601 | A | 3/2013 |

* cited by examiner

DISPLAY SUBSTRATE, DISPLAY DEVICE AND MANUFACTURING METHOD

CROSS-REFERENCES TO RELATED APPLICATIONS

The disclosure is a US National Stage of International Application No. PCT/CN2023/088877, filed on Apr. 18, 2023, which claims the priority to Chinese patent application No. 202210593333.4, filed with China National Intellectual Property Administration on May 27, 2022, and entitled "DISPLAY SUBSTRATE, DISPLAY DEVICE AND MANUFACTURING METHOD", the entire content of which is incorporated by reference herein.

TECHNICAL FIELD

The disclosure relates to the field of display technology, in particular to a display substrate, a display device and a manufacturing method.

BACKGROUND

At present, the electronic paper (such as EPD) on the market mainly uses the microcup/microcapsule type electronic paper film, and uses electronic ink in the microcups/microcapsules to achieve black, white, and red displays.

However, the microcup/microcapsule electronic paper film has a high technical barrier, forming a de facto technology monopoly, which makes the shipment volume and price of the electronic paper seriously affected by the manufacturer of the microcup/microcapsule electronic paper film, which is not conducive to the overall expansion of the electronic paper market.

SUMMARY

Embodiments of the disclosure provide a display substrate, a display device, and a manufacturing method to solve the above problems existing in the related art.

In a first aspect, in order to solve the above technical problems, an embodiment of the disclosure provides a display substrate, including: a base substrate; a plurality of gate lines disposed on the base substrate and extending along a first direction and arranged along a second direction; a plurality of data lines located on the base substrate and extending along the second direction and arranged along the first direction, where the second direction intersects the first direction, and the plurality of gate lines and the plurality of data lines define a plurality of sub-pixel regions; a plurality of sub-pixel electrodes located in the plurality of sub-pixel regions on the base substrate; a plurality of driving transistors disposed on the base substrate and electrically connected with the plurality of data lines, the plurality of gate lines and the plurality of sub-pixel electrodes; and a bar structure on a side of a layer where the plurality of sub-pixel electrodes are located away from the base substrate, where the bar structure has an opening region for accommodating charged particles in each of the plurality of sub-pixel regions, an orthographic projection of the bar structure on the base substrate at least partially covers orthographic projections of the plurality of gate lines and the plurality of data lines on the base substrate, and a ratio of an area of a sub-pixel electrode to an area of a sub-pixel region is greater than 70%.

In some embodiments, the bar structure includes: first bars extending along the first direction and arranged along the second direction, and second bars extending along the second direction and arranged along the first direction. An orthographic projection of the first bar on the base substrate at least partially covers the orthographic projection of the gate line on the base substrate, and an orthographic projection of the second bar at least partially covers the orthographic projection of data line and has an overlapping region with the orthographic projection of the sub-pixel electrode on the base substrate.

In some embodiments, a cross section of the first bar along the second direction and a cross section of the second bar along the first direction both are trapezoid shaped.

In some embodiments, a ratio of a top side to a bottom side of the trapezoid ranges from 0.5 to 0.8.

In some embodiments, the display substrate further includes: a first block electrode and a second block electrode stacked in each of the plurality of sub-pixel regions on the base substrate. The first block electrode, a gate of the driving transistor and the gate line are all disposed in a gate metal layer. The second block electrode and a source and a drain of the driving transistor are all disposed in a source-drain metal layer. The source-drain metal layer is located between the gate metal layer and the layer where the plurality of sub-pixel electrodes are located. A first storage capacitor is formed between the sub-pixel electrode and the second block electrode, and a second storage capacitor is formed between the second block electrode and the first block electrode.

In some embodiments, in the opening region of the bar structure, the sub-pixel electrode is electrically connected with a first block electrode through a first via, and the sub-pixel electrode is electrically connected with a source of a driving transistor through a second via.

In some embodiments, second block electrodes are electrically connected through a common electrode line with an extension direction consistent with an extension direction of the data line. The orthographic projection of the bar structure at least partially covers an orthographic projection of the common electrode line or is in contact with the orthographic projection of the common electrode line on the base substrate.

In some embodiments, the display substrate further includes: an inorganic insulating layer between a layer where the plurality of driving transistors are located and the layer where the plurality of sub-pixel electrodes are located. The orthographic projection of the sub-pixel electrode covers the orthographic projection of the driving transistor on the base substrate, an organic insulating layer is provided between the inorganic insulating layer and the layer where the plurality of sub-pixel electrodes are located, and a thickness of the organic insulating layer is greater than a thickness of the inorganic insulating layer.

In some embodiments, the orthographic projection of the driving transistor does not overlap the orthographic projection of the sub-pixel electrode on the base substrate, and the orthographic projection of the driving transistor overlaps the orthographic projection of the gate line and is located between orthographic projections of two data lines on the base substrate. A line width of the gate line in a region where the orthographic projection of the gate line overlaps the orthographic projection of the driving transistor is greater than a line width of the gate line in other regions.

In some embodiments, the display substrate further includes: a semiconductor layer between the source-drain metal layer and the gate metal layer; and the semiconductor layer is in contact with the source-drain metal layer, and the semiconductor layer comprises active layers of the plurality of driving transistors, and third block electrodes with a pattern consistent with a pattern of the second block electrodes.

In some embodiments, a material of the organic insulating layer and a material of the bar structure are both resin.

In a second aspect, an embodiment of the disclosure provides a manufacturing method for a display substrate, including:

providing a base substrate;

sequentially forming a plurality of gate lines extending along a first direction and arranged along a second direction as well as a plurality of data lines extending along the second direction and arranged along the first direction on a surface of the base substrate; wherein the second direction intersects the first direction, and the plurality of gate lines and the plurality of data lines define a plurality of sub-pixel regions;

forming a plurality of driving transistors while forming the plurality of gate lines and the plurality of data lines;

after forming the plurality of driving transistors, sequentially forming an inorganic insulating layer and a plurality of sub-pixel electrodes; wherein a ratio of an area of a sub-pixel electrode to an area of a sub-pixel region is greater than 70%; and forming a bar structure surrounding each of the plurality of sub-pixel regions, wherein the bar structure has an opening region for accommodating charged particles in each of the plurality of sub-pixel regions, and an orthographic projection of the bar structure on the base substrate at least partially covers orthographic projections of the plurality of gate lines and the plurality of data lines on the base substrate.

In some embodiments, when an orthographic projection of the sub-pixel electrode covers an orthographic projection of the driving transistor on the base substrate, the manufacturing method further includes:

after forming the inorganic insulating layer and before forming the plurality of sub-pixel electrodes, forming an organic insulating layer with a thickness greater than a thickness of the inorganic insulating layer.

In some embodiments, when an orthographic projection of the sub-pixel electrode does not overlap an orthographic projection of the driving transistor on the base substrate, the forming the plurality of gate Lines includes:

forming the plurality of gate lines with a width in a region where orthographic projections of the gate lines overlap orthographic projections of the driving transistors greater than a width of the gate lines in other regions.

In a third aspect, an embodiment of the disclosure provides a display device, including:

the display substrate according to the first aspect, an opposing substrate opposite to the display substrate, an electronic slurry layer filled in each opening region of the bar structure, and a common electrode layer on a side of the opposing substrate facing the display substrate; where the electronic slurry layer are provided with charged particles of at least two colors inside.

In a fourth aspect, an embodiment of the disclosure provides a manufacturing method for a display device, including:

providing the display substrate according to the first aspect;

filling the bar structure of the display substrate with an electronic slurry layer;

filling the bar structure with the electronic slurry layer with charged particles of at least two colors; and forming an opposing substrate opposite to the display substrate on the bar structure filled with charged particles of at least two colors, where a common electrode is provided on a side of the opposing substrate close to the display substrate.

Figure 1:
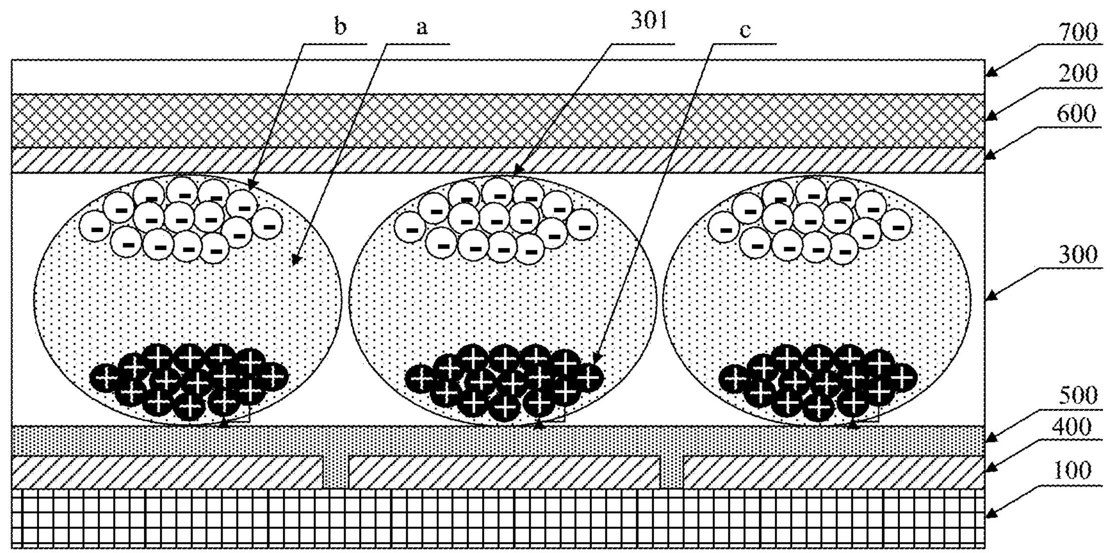
FIG. 1 is a schematic structural diagram of an electronic paper product in the related art.

REFERENCE SIGNS first direction—X, second direction—Y, sub-pixel region-ara;

base substrate—1, gate line—2, data line—3, sub-pixel electrode—4, driving transistor—5, bar structure—6, first bar 61, second bar—62, inorganic insulating layer—7, organic insulating layer—8, first block electrode—9, second block electrode—10, common electrode line—11, and third block electrode—12.

DETAILED DESCRIPTION

Embodiments of the disclosure provide a display substrate, a display device and a manufacturing method to solve the above problems.

In order to make the above objects, features and advantages of the disclosure more obvious and understandable, the disclosure will be further described below in conjunction with the accompanying drawings and embodiments. However, the example implementations may be embodied in various forms and should not be understood to be limited to the implementations set forth herein; rather, these implementations are provided so that the disclosure will be thorough and complete, and the concepts of the example implementations will be fully conveyed to those skilled in the art. The same reference signs in the drawings indicate the same or similar structures, and thus their repeated descriptions will be omitted. The words expressing position and direction described in the disclosure are all explained by taking the accompanying drawings as examples, but they can be changed as needed, and all changes are included in the claimed scope of the disclosure. The drawings of the disclosure are only used to illustrate relative positional relationships and do not indicate true proportions.

It should be noted that specific details are set forth in the following description to facilitate a thorough understanding of the disclosure. However, the disclosure can be implemented in many other ways than those described here, and those skilled in the art can make similar extensions without violating the connotation of the disclosure. The disclosure is therefore not limited by the specific embodiments disclosed below. The subsequent descriptions in the specification are preferred implementations for implementing the disclosure. However, the descriptions are for the purpose of illustrating the general principles of the disclosure and are not intended to limit the scope of the disclosure. The claimed scope of the disclosure shall be determined by the appended claims.

Please refer to FIG. 1 which is a schematic structural diagram of an electronic paper product in the related art. The electronic paper product includes an array substrate 100, an opposing substrate 200 opposite to the array substrate 100, and a microcapsule layer 300 between the array substrate 100 and the opposing substrate 200. The microcapsule layer 300 includes a plurality of microcapsules 301, each microcapsule 301 is filled with a transparent electrophoretic fluid a, charged white pigments b and charged black pigments c. Generally, the electric polarities of the charged pigments of the two colors are opposite. Each microcapsule 301 in the above-mentioned microcapsule layer 300 corresponds to one pixel, and a surface of the array substrate 100 close to the microcapsule layer 300 is provided with pixel electrodes 400 corresponding one-to-one with pixels. The driving transistors (not shown in FIG. 1) in the array substrate 100 are electrically connected one-to-one with the pixel electrodes 400. A laminating adhesive 500 is further provided on the side of the pixel electrodes 400 close to the microcapsule layer 300, and the laminating adhesive 500 is used to fix the microcapsules 301. The common electrode layer 600 is provided on a surface of the opposing substrate 200 close to the microcapsule layer 300, and a protective film 700 is provided on a surface of the opposing substrate 200 away from the microcapsule layer 300 for protecting the opposing substrate 200. The opposing substrate 200 may be made of the polyethylene terephthalate (PolyEthylene Terephthalate, PET) film.

In related art, there is a high technical barrier to manufacturing the above-mentioned microcapsules 301 for commercialization.

Figure 2:
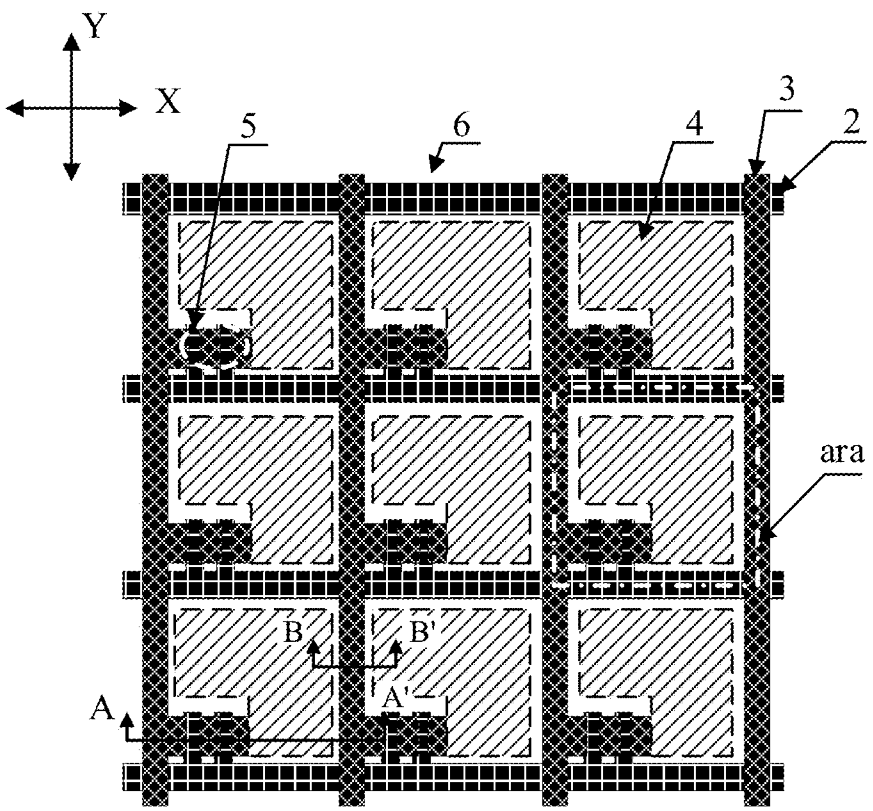
FIG. 2 is a schematic structural diagram of a partial region of a display substrate provided by an embodiment of the disclosure.
Figure 3:
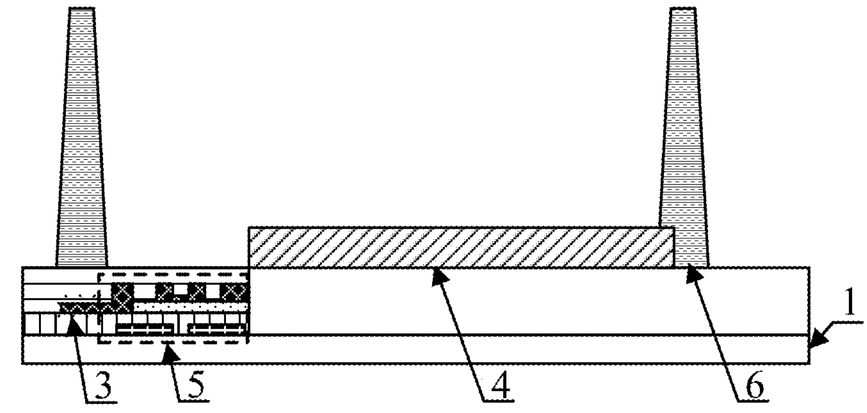
FIG. 3 is a cross-sectional view of the display substrate in a direction AA' shown in FIG. 2 provided by an embodiment of the disclosure.

Please refer to FIGS. 2 and 3. FIG. 2 is a schematic structural diagram of a partial region of a display substrate provided by an embodiment of the disclosure. FIG. 3 is a cross-sectional view of the display substrate in the direction AA' of FIG. 2 provided by an embodiment of the disclosure. The disclosure further provides a display substrate with simpler preparation methods and processes and excellent display effects. The display substrate in the disclosure includes:

a base substrate 1;

a plurality of gate lines 2 disposed on the base substrate 1, extending along a first direction X and arranged along a second direction Y;

a plurality of data lines 3 disposed on the base substrate 1, extending along the second direction Y and arranged along the first direction X; where the second direction Y intersects the first direction X, and the plurality of gate lines 2 and the plurality of data lines 3 define a plurality of sub-pixels regions ara.

Since the gate lines 2 and the data lines 3 usually have a certain width in the display substrate, the sub-pixel region ara defined by the gate lines 2 and the data lines 3 may be a pattern (such as the shape surrounded by the white dotted line in FIG. 2) defined by center lines of the gate lines 2 (extending along the first direction X) and center lines of the data lines 3 (extending along the second direction Y).

The display substrate in the disclosure further includes:

a plurality of sub-pixel electrodes 4 located in a plurality of sub-pixel regions ara on the base substrate 1; and a plurality of driving transistors 5 disposed on the base substrate 1 and electrically connected with the data lines 3, the gate lines 2 and the sub-pixel electrodes 4; optionally, the driving transistor 5 is a transistor with a double-gate structure, that is, composed of two transistors in parallel, and the driving capability of the driving transistor 5 can be improved by using the driving transistor 5 with the double-gate structure; alternatively, the driving transistor 5 can be a transistor with a single-gate structure, which is not limited here. The driving transistor 5 shown in FIGS. 2 and 3 is a bottom-gate transistor. In practical applications, the driving transistor 5 may alternatively be a top-gate transistor.

It should be noted that a structure of a part of film layers (the blank region between the base substrate 1 and the sub-pixel electrode 4) that is in the same layer as the driving transistor 5 and is located at the right side of the driving transistor 5 in FIG. 3 is not shown. It should not be understood that this part of film layers are one film layer.

The display substrate in the disclosure further includes: a bar structure 6 at a side of a layer where the sub-pixel electrodes 4 are located away from the base substrate 1. The bar structure 6 includes an opening region for accommodating charged particles in each sub-pixel region ara. An orthographic projection of the bar structure 6 on the base substrate 1 at least partially covers orthographic projections of the gate lines 2 and the data lines 3 on the base substrate 1. A ratio of an area of the sub-pixel electrode 4 to an area of the sub-pixel region ara is greater than 70%. The bar structure 6 may cover a part of the sub-pixel electrodes 4, or may not overlap the sub-pixel electrodes 4.

As shown in FIG. 2, one opening region in the bar structure 6 corresponds to one sub-pixel electrode 4, and an area of the opening region in the bar structure 6 is smaller than the area of the sub-pixel electrode 4. The area of the above-mentioned sub-pixel electrode 4 is an area of the orthographic projection of the sub-pixel electrode 4 in the corresponding sub-pixel region ara on the base substrate 1. The ratio of the area of the sub-pixel electrode 4 to the area of the sub-pixel region ara can be set to 75%, 80%, 85%, 88%, 90%, etc., and a size of the sub-pixel electrode 4 can be adjusted according to the provided ratio.

In the embodiment provided by the disclosure, the bar structure 6 is provided at the side of the layer where the sub-pixel electrodes 4 are located away from the base substrate 1, and the orthographic projection of the bar structure 6 on the base substrate 1 at least partially covers the orthographic projections of the gate lines 2 and the data lines 3 on the base substrate 1, which allows the opening regions in the bar structure 6 for accommodating charged particles to correspond to the sub-pixel regions ara, so that the opening regions of the bar structure 6 can be used to replace microcapsules or microcups accommodating charged particles in the related art. The overall expansion of the electronic paper market is no longer limited by factors such as the shipment volume and price of a single manufacturer. Additionally, since the bar structure 6 at least partially covers the gate lines 2 and the data lines 3, the opening regions of the bar structure 6 match the sub-pixel regions ara in size. Compared with the solution using microcapsule/microcup paper films in the related art, it has the advantages such as a higher resolution and contrast, and a lower driving voltage. Optionally, the bar structure 6 covers all the gate lines 2 and the data lines 3. Optionally, the bar structure 6 covers all the gate lines 2 and the data lines 3 and extends beyond the gate lines and the data lines, which are not limited here. Meanwhile, the ratio of the area of the sub-pixel electrode 4 to the area of the sub-pixel region ara is set to be greater than 70%, allowing the electronic slurry filled subsequently in the opening regions of the bar structure 6 to be fully driven, and the charged particles filled in the opening regions of the bar structure 6 to be uniformly driven.

Figure 4:
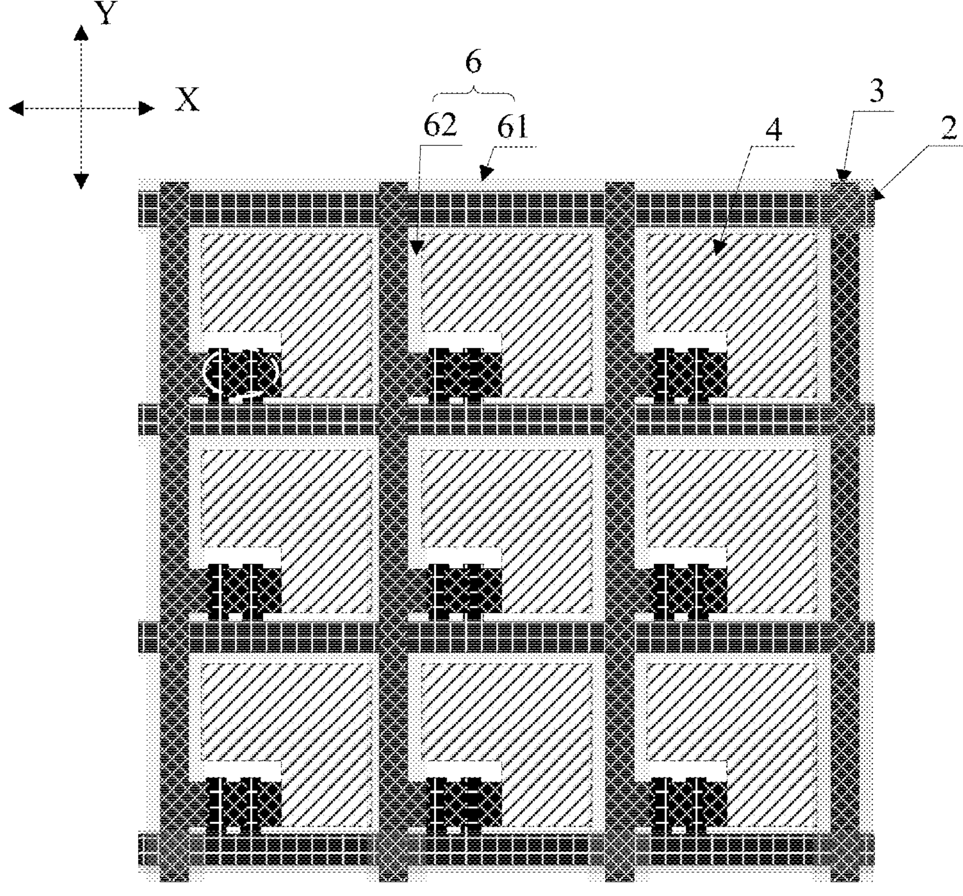
FIG. 4 is a top view of part of a bar structure in a display substrate provided by an embodiment of the disclosure.

Please refer to FIG. 4 which is a top view of part of the bar structure in the display substrate provided by an embodiment of the disclosure. The bar structure 6 includes: first bars 61 extending along the first direction X and arranged along the second direction Y, and second bars 62 extending along the second direction Y and arranged along the first direction X. The first bars 61 and the second bars 62 are arranged in the same one layer, and two adjacent columns or two adjacent rows of sub-pixel regions ara share a same one first bar 61 or a same one second bar 62.

An orthographic projection of the first bar 61 at least partially covers the orthographic projection of the gate line 2 on the base substrate 1, and an orthographic projection of the second bar 62 at least partially covers the orthographic projection of the data line 3 on the base substrate 1 and has an overlapping region with the orthographic projection of the sub-pixel electrode 4. The orthographic projection of the first bar 61 can fully cover the orthographic projection of the gate line 2 on the base substrate 1, and the orthographic projection of the second bar 62 can also fully cover the orthographic projection of the data line 3 on the base substrate 1.

Figure 5:
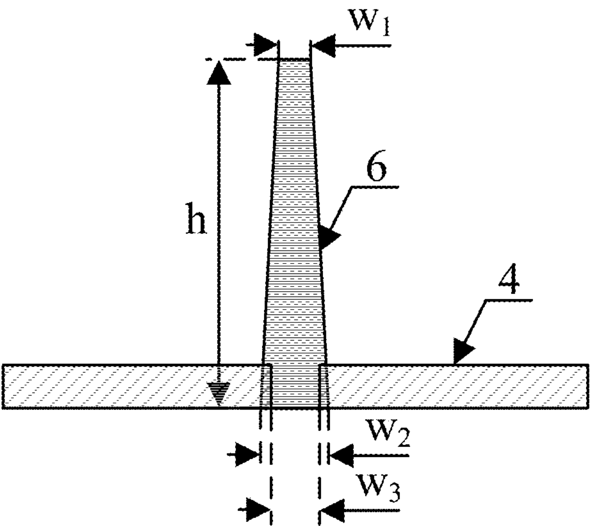
FIG. 5 is a cross-sectional view of a second bar in a direction BB' in FIG. 2 provided by an embodiment of the disclosure.

Please refer to FIG. 5 which is a cross-sectional view of the second bar in the direction BB' in FIG. 2 provided by an embodiment of the disclosure.

A cross section of the first barrier strip 61 along the second direction Y and a cross section of the second barrier strip 62 along the first direction X both are trapezoid shaped. Optionally, the trapezoid in the disclosure can be an isosceles trapezoid, which is not limited here. The shape and size of the cross section of the first bar 61 along the second direction Y are the same as the shape and size of the cross section of the second bar 62 along the first direction X, and optionally, both the shapes are isosceles trapezoids, as shown in FIG. 5. A length of a top side of the isosceles trapezoid is w1, and a value of w1 ranges from 6 um to 16 um. A length of a bottom side of the isosceles trapezoid is w2, and a value of w2 ranges from 11 um to 21 um. A height of the isosceles trapezoid is h, and a value of h ranges from 4 um to 10 um. For example, the length of the top side of the isosceles trapezoid can be set as 11 um, the length of the bottom side of the isosceles trapezoid can be set as 16 um, and the height of the isosceles trapezoid can be set as 5 um.

A ratio of the top side to the bottom side of the above-mentioned isosceles trapezoid can be set to range from 0.5 to 0.8. After determining the length of the top side or the length of the bottom side of the isosceles trapezoid, the length of the other side can be quickly determined based on this ratio.

Please continue to refer to FIG. 5, a gap between two adjacent sub-pixel electrodes 4 is w3, and w3≤10 um. By setting the gap between two adjacent sub-pixel electrodes 4 to be less than or equal to 10 um, the area of the sub-pixel electrode(s) 4 can be made as large as possible, thereby improving the coverage of the vertical electric field in the sub-pixel region ara.

It should be understood that the above-mentioned gap between two adjacent sub-pixel electrodes 4 does not include a gap in which the driving transistor 5 is disposed.

In the embodiment provided by the disclosure, the cross section of the first bar 61 along the second direction Y and the cross section of the second bar 62 along the first direction X both are set to be trapezoid shaped, making the formed first bar 61 and second bar 62 more stable, and making the size and shape of each opening region in the bar structure 6 consistent to better match the sub-pixel region ara. The shape of the cross section of the first bar 61 along the second direction Y and the shape of the cross section of the second bar 62 along the first direction X are both set as an isosceles trapezoid, the ratio of the top side of the isosceles trapezoid to the bottom side of the isosceles trapezoid is set in the range of 0.5 to 0.8, and the height of the isosceles trapezoid is set to range from 4 to 6 um, allowing each opening region of the bar structure 6 to be filled with enough electronic slurry without causing the crosstalk between electronic slurry filled in the adjacent opening regions, thereby effectively improving the display effect of the display device including the above-mentioned display substrate.

Figure 6:
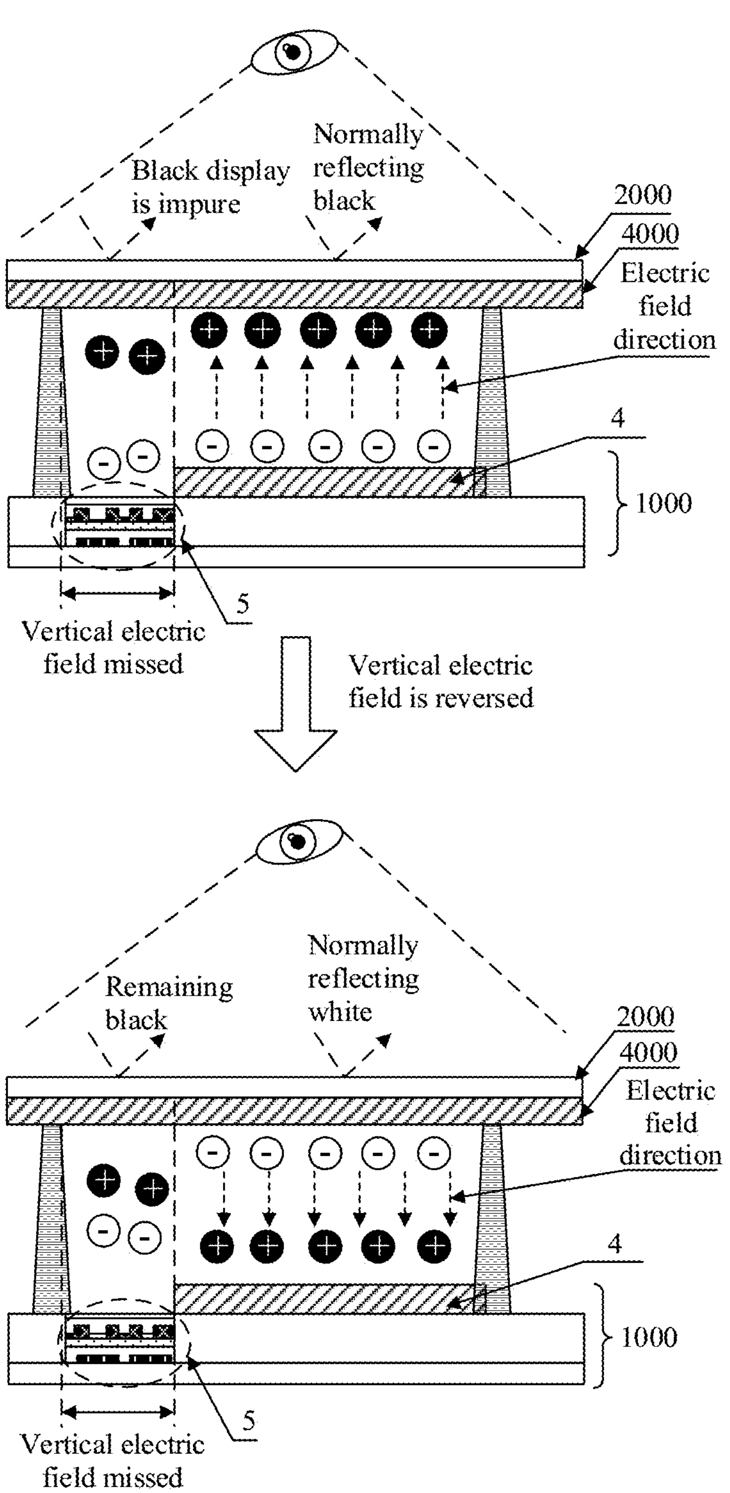
FIG. 6 illustrates a display principle of a display device formed using the display substrate in FIG. 3 provided by an embodiment of the disclosure.

Please refer to FIG. 6 which illustrates a display principle of a display device formed using the display substrate in FIG. 3 provided by an embodiment of the disclosure.

In FIG. 6, an opposing substrate 2000 is provided opposite to the display substrate. A common electrode 4000 is provided on a surface of the opposing substrate 2000 close to the display substrate. When voltages applied to the common electrode 4000 and the sub-pixel electrode 4 form a vertical electric field, an electric field direction of the vertical electric field as shown in the upper part of FIG. 6 is a direction from the display substrate 1000 towards the opposing substrate 2000. At this time, the black charged particles (assumed to have "+" charges) move to the surface of the display device (i.e., a surface of which close to the opposing substrate) due to the vertical electric field, the light rays are reflected by the surface of the display device, and are normally reflected to show black in the region covered by the vertical electric field (that is, the user sees a black screen). In the region not covered by the vertical electric field (a region of an orthographic projection of the driving transistor 5 on the opposing substrate), even if it is affected by the edge electric field of the vertical electric field, the black display in this region will be impure due to the weak edge electric field, thus affecting the display effect.

When the vertical electric field is reversed and the electric field direction of the vertical electric field changes to the direction from the opposing substrate 2000 towards the display substrate 1000, under the action of the vertical electric field, the white charged particles (assumed to have "−" charges) move to the surface of the display device, and the light rays are reflected by the surface of the display device, and are normally reflected to show white in the region covered by the vertical electric field, and the user sees a white screen. While in the region of an orthographic projection of the driving transistor 5 on the opposing substrate 2000, the white charged particles have not yet reached the surface of the display device by crossing the black charged particles due to the weak edge electric field, the black remains in this region, and the user sees a black afterimage in this region, thereby affecting the display effect.

In order to improve the display effect, embodiments of the disclosure provide the following two solutions to increase the area of the sub-pixel electrode 4, so that the ratio of the area of the sub-pixel electrode 4 to the area of the sub-pixel region ara is greater than 88%, thereby allowing the charged particles in the bar structure can be fully driven regardless of their location.

Optionally, in the display substrate provided by the embodiment of the disclosure, the sub-pixel electrode 4 covers the driving transistor 5, and optionally at least partially covers the driving transistor 5. The sub-pixel electrode 4 covers part of the driving transistor 5, e.g., more than 50% the driving transistor 5 in size, or the entire driving transistor 5, which is not limited here.

Figure 7:
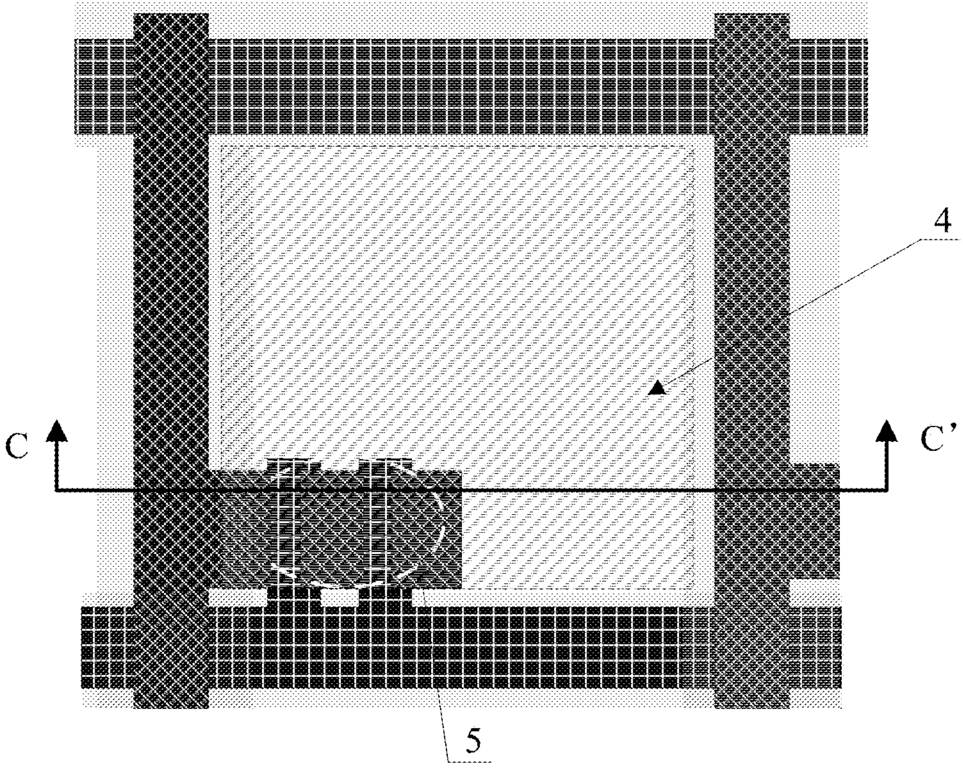
FIG. 7 is a top view of one sub-pixel region in a display substrate provided by an embodiment of the disclosure.
Figure 8:
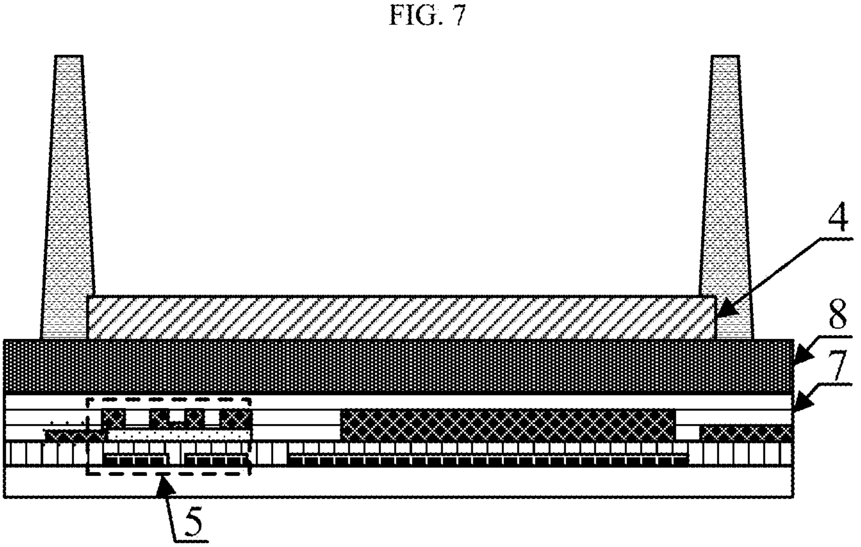
FIG. 8 is a cross-sectional view along a direction CC' in FIG. 7 provided by an embodiment of the disclosure.

Please refer to FIGS. 7 and 8. FIG. 7 is a top view of one sub-pixel region in a display substrate provided by an embodiment of the disclosure. FIG. 8 is a cross-sectional view along the direction CC' in FIG. 7 provided by an embodiment of the disclosure. The display substrate further includes:

- an inorganic insulating layer 7 between a layer where the driving transistors 5 are located and the layer where the sub-pixel electrodes 4 are located; and
- an orthographic projection of the sub-pixel electrode 4 on the base substrate 1 covers the orthographic projection of the driving transistors 5, an organic insulating layer 8 is provided between the inorganic insulating layer 7 and the layer where the sub-pixel electrodes 4 are located, and a thickness of the organic insulating layer 8 is greater than a thickness of the inorganic insulating layer 7.

The above-mentioned inorganic insulating layer 7 can be made of silicon nitride, and the organic insulating layer 8 and the bar structure 6 can be made of the same material, such as resin. The thickness of the organic insulating layer 8 may be more than 2.5 times the thickness of the inorganic insulating layer 7. For example, the thickness of the organic insulating layer 8 may range from 15000 Å to 19000 Å, and the thickness of the inorganic insulating layer 7 may range from 3500 Å to 6000 Å.

In the embodiment provided by the disclosure, by adding an organic insulating layer 8, the thickness of which is greater than the thickness of the inorganic insulating layer 7, between the inorganic insulating layer 7 and the layer where the sub-pixel electrodes 4 are located, it can be beneficial for the organic insulating layer 8 and the inorganic insulating layer 7 together to insulate the sub-pixel electrode 4 covering the driving transistor 5 from the source, the drain and the active layer in the driving transistor 5 to avoid, when the organic insulating layer 8 with the above thickness is not added, the shift of the characteristics of the driving transistor 5 due to the top-gate structure composed of the sub-pixel electrode 4, the inorganic insulating layer 7, and the source, the drain and the active layer in the driving transistor 5 because the sub-pixel electrode 4 covers the driving transistor 5, thereby keeping the characteristics of the driving transistor 5 stable while increasing the area of the sub-pixel electrode 4 (i.e. increasing the ratio of the area of the sub-pixel electrode 4 to the area of the sub-pixel region ara).

In addition, the above-mentioned organic insulating layer 8 may not be added, but the thickness of the above-mentioned inorganic insulating layer 7 may be increased to the total thickness of the inorganic insulating layer 7 and the organic insulating layer 8 in FIG. 8, which can also avoid the shift of the characteristics of the driving transistor 5 due to the top-gate structure composed of the sub-pixel electrode 4, the inorganic insulating layer 7, and the source, the drain and the active layer in the driving transistor 5 because the sub-pixel electrode 4 covers the driving transistor 5.

Please refer to Table 1 which shows, under the 4 Mask process (that is, when the above-mentioned organic insulating layer 8 is not provided between the inorganic insulating layer 7 and the sub-pixel electrode 4), the on/off current of the driving transistor 5 which is arranged in the opening region and is covered or not covered by the sub-pixel electrode 4.

TABLE 1

| Whether the sub-pixel covers the driving transistor | On current ($I_{on}$/uA) | Off current ($I_{off}$/uA) |
|---|---|---|
| No | 322.17 | 41.40 |
| Yes | 353.55 | 398.00 |

It can be seen from Table 1 that when the sub-pixel electrode 4 directly covers the driving transistor 5 based on the related art, the off current of the driving transistor 5 will be significantly increased, which is caused by the shift of the characteristics of the driving transistor 5 due to the top gate structure composed of the sub-pixel electrode 4, the inorganic insulating layer 7, and the source, the drain and the active layer in the driving transistor 5 because the sub-pixel electrode 4 covers the driving transistor 5.

Table 2 shows, when the solution provided with the organic insulating layer 8 in the disclosure is adopted (that is, the sub-pixel electrode 4 covers the driving transistor 5, and the organic insulating layer 8 is added between the inorganic insulating layer 7 and the sub-pixel electrode 4), the on current and the off current of the driving transistor measured.

TABLE 2

| | On current ($I_{on}$/uA) | Off current ($I_{off}$/uA) |
|---|---|---|
| Average value | 3.28 | 0.25 |
| Intermediate value | 3.01 | 0.15 |
| Minimum value | 2.98 | 0.05 |
| Maximum value | 4.10 | 0.75 |

As can be seen from Table 2, in the solution provided with the organic insulating layer 8, the on current and the off current of the driving transistor 5 are both small. In this solution, the above-mentioned top gate structure is not formed to affect the characteristics of the driving transistor 5.

In the solution provided with the organic insulating layer 8, the bar structure 6 does not cover the driving transistor 5.

In another display substrate provided in the disclosure, the sub-pixel electrode 4 does not cover the driving transistor 5, and the gate of the driving transistor 5 reuses as the gate line 2.

Figure 9:
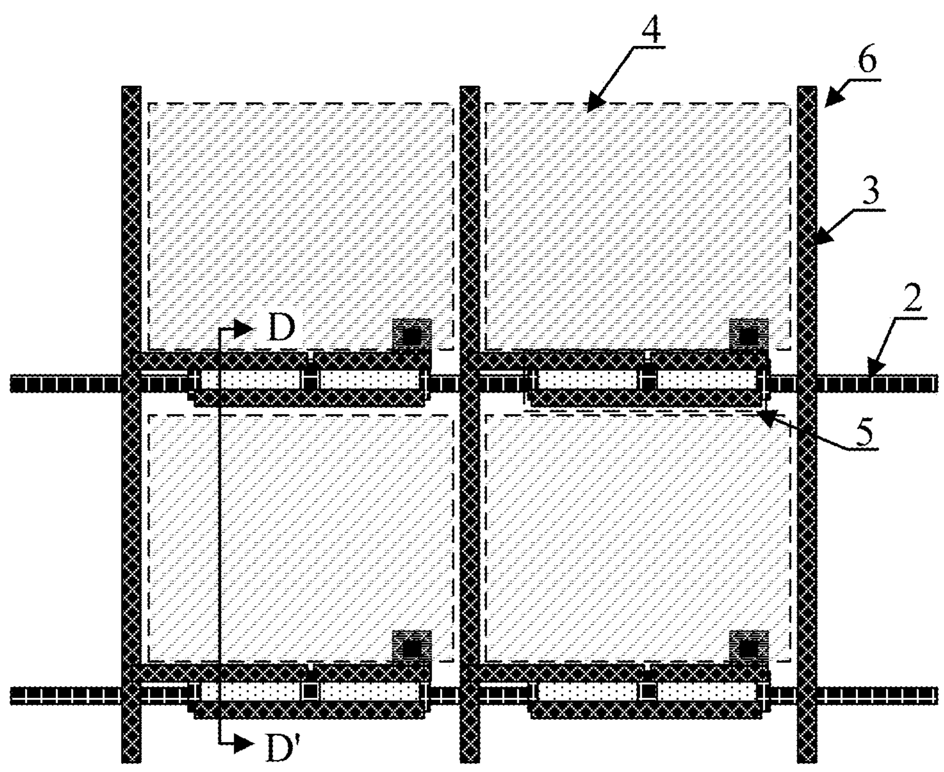
FIG. 9 is a top view of a part of sub-pixel regions of another display substrate provided by an embodiment of the disclosure.
Figure 10:
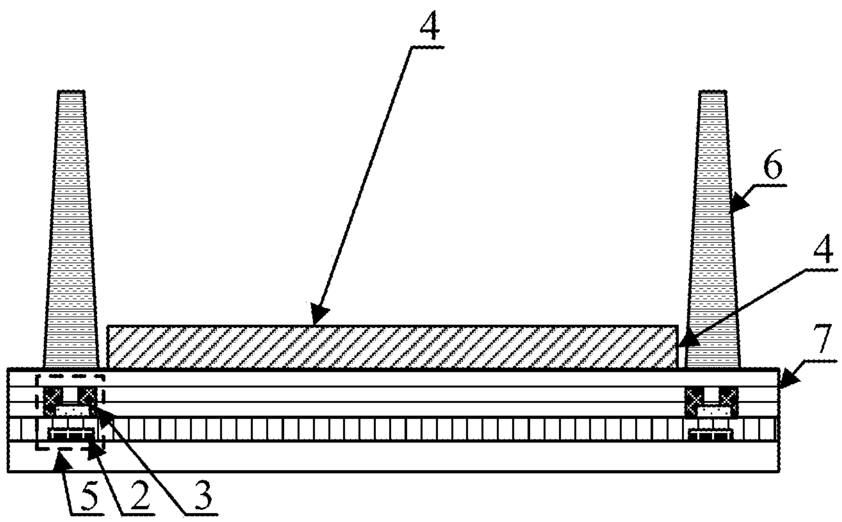
FIG. 10 is a cross-sectional view along a direction DD' in FIG. 9 provided by an embodiment of the disclosure.

Please refer to FIG. 9 which is a top view of a part of sub-pixel regions in another display substrate provided by an embodiment of the disclosure, and FIG. 10 is a cross-sectional view along the direction DD' in FIG. 9 provided by an embodiment of the disclosure.

In the display substrate, the orthographic projection of the driving transistor 5 on the base substrate 1 does not overlap and the orthographic projection of the sub-pixel electrode 4 (shown in the hatched regions in FIGS. 9 and 10) on the base substrate. The orthographic projection of the driving transistor 5 overlaps the orthographic projection of the gate line 2 and is located between orthographic projections of two data lines 3 on the base substrate 1.

A line width of the gate line 2 in a region where the orthographic projection of the gate line overlaps the orthographic projection of the driving transistor 5 is greater than a line width of the gate line in other regions.

FIG. 10 is a cross-sectional view along the direction DD' in FIG. 9, and shows a part of the region where the orthographic projection of the gate line overlaps the orthographic projection of the driving transistor 5. The width of the gate line 2 in this overlapping region is greater than the width of the gate line the remaining region(s) (combined with FIG. 9), in this way, the wider portion of the gate line 2 can be used not only as a component of the gate line 2, but also as the gate of the driving transistor 5, so that the gate of the driving transistor 5 can reuse the gate line 2, and thus the area of the orthographic projection of the driving transistor 5 on the base substrate 1 is reduced, so that the area of the sub-pixel electrode 4 can be increased even when not covering the driving transistor 5, thereby increasing the ratio of the sub-pixel electrode 4 to the sub-pixel region ara to make it greater than 88%. Moreover, since this solution does not need to add an organic insulating layer 8 between the inorganic insulating layer 7 and the sub-pixel electrode 4 like the solution in which the organic insulating layer 8 is provided, on the one hand, it can reduce the thickness of the display substrate, and on the other hand, there is no need to add processes related to the organic insulating layer 8 during manufacture, that is, it can be completed using the existing 4 mask process, which can effectively save processes, time and costs, and increase production capacity.

Under the solution where the gate of the driving transistor 5 reuses the gate line 2, the gap between two adjacent sub-pixel electrodes 4 can be set to less than or equal to 10 um, and compared the process in the related art where the gap between adjacent sub-pixel electrodes 4 is 14 um, it can further increase the area of the sub-pixel electrode 4, to further increase the ratio of the area of the sub-pixel electrode 4 to the area of the sub-pixel region ara. In the same one display substrate, the gap between the sub-pixel electrodes 4 arranged along the first direction X and the gap between the sub-pixel electrodes 4 arranged along the second direction Y may be the same or different. When the gate of the driving transistor 5 reuses the gate line 2, the gap between the sub-pixel electrodes 4 arranged along the second direction Y may be greater than the gap between the sub-pixel electrodes 4 arranged along the first direction X.

The above-mentioned gap between the adjacent sub-pixel electrodes 4 can be set according to the ratio of the area of the sub-pixel electrode 4 and the area of the sub-pixel region ara, and the precision of the device actually used. Of course, under the requirement of meeting the ratio of the area of the sub-pixel electrode 4 and the area of the sub-pixel region ara, the gap between adjacent sub-pixel electrodes 4 can be as large as possible, so as to prevent the adjacent sub-pixel electrodes 4 from short-circuiting.

Figure 11:
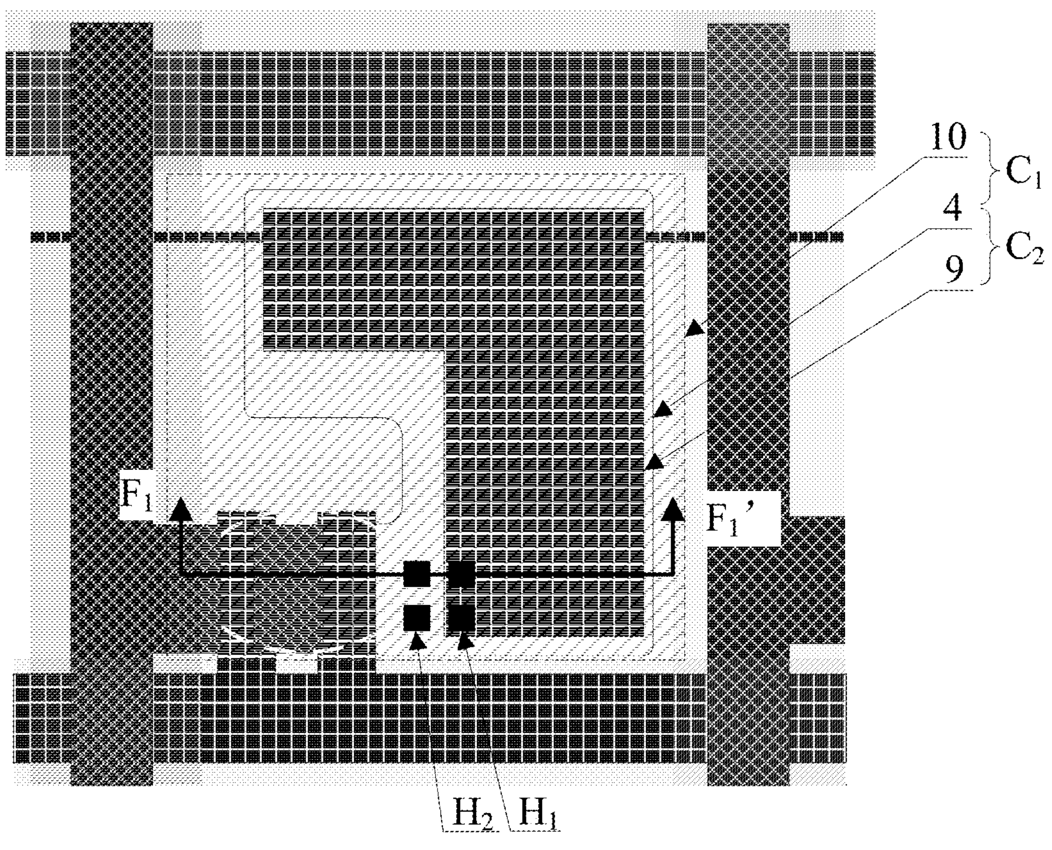
FIG. 11 is a top view of a part of sub-pixel regions of another display substrate provided by an embodiment of the disclosure.
Figure 12:
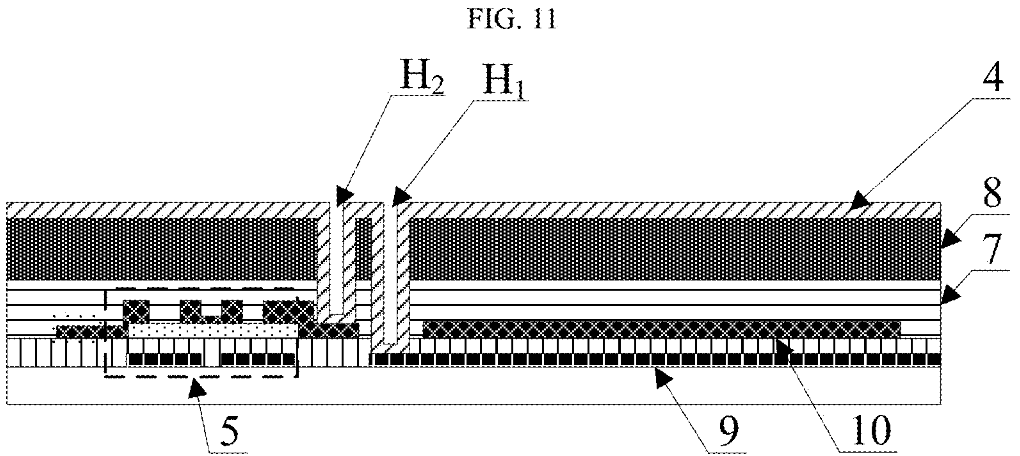
FIG. 12 is a cross-sectional view along a direction $F_1F_1'$ in FIG. 11 provided by an embodiment of the disclosure.

Please refer to FIGS. 11 to 12. FIG. 11 is a top view of a part of sub-pixel regions of another display substrate provided by an embodiment of the disclosure. FIG. 12 is a cross-sectional view in the direction $F_1F_1'$ of FIG. 11 provided by an embodiment of the disclosure. The display substrate further includes:

- a first block electrode 9 and a second block electrode 10 stacked in each of the plurality of sub-pixel regions ara on the base substrate 1;
- the first block electrode 9, the gate of the driving transistor 5 and the gate line 2 are all disposed in a gate metal layer, and the second block electrode 10 and the source and drain of the driving transistor 5 are all disposed in a source-drain metal layer;
- the source-drain metal layer is located between the gate metal layer and the layer where the sub-pixel electrode 4 is located; and
- a first storage capacitor C1 formed between the sub-pixel electrode 4 and the second block electrode 10, and a second storage capacitor C2 formed between the second block electrode 10 and the first block electrode 9.

In the opening region(s) of the bar structure 6, the sub-pixel electrode 4 is electrically connected with the first block electrode 9 through the first via H1, and the sub-pixel electrode 4 is electrically connected with the source of the driving transistor 5 through the second via H2. The first via H1 and the second via H2 are provided close to the gate line 2.

FIG. 11 corresponds to the solution provided with the organic insulating layer 8. The first block electrode 9 is provided in the gate metal layer and the second block electrode 10 is provided in the source-drain metal layer. In this way, the sub-pixel electrode 4 and the second block electrode 10 form the first storage capacitor C1, and the second block electrode 10 and the first block electrode 9 form the second storage capacitor C2, so that the first block electrode 9, the second block electrode 10, and the sub-pixel electrode 4 can be utilized to form a double storage capacitor, which make the pixel voltage in the sub-pixel region ara not power down quickly, thereby fully driving the electronic slurry and charged particles accommodated in the opening region of the bar structure 6. FIG. 12 is a cross-sectional view in the direction $F_1F_1'$ in FIG. 11. In FIG. 11, the same film layers are electrically connected through two vias in the same one column. The sub-pixel electrode 4 and the first block electrode 9 are all electrically connected through the first vias H1 in right column of vias in FIG. 11, and the sub-pixel electrode 4 and the source of the driving transistor 5 are electrically connected through the second vias H2 in left column of vias in FIG. 11. The above-mentioned first block electrode 9 is electrically connected with the sub-pixel electrode 4 through the first via to load the pixel voltage, and the second block electrode 10 is electrically connected with the common voltage signal line through the via around the display region of the display substrate to load the common voltage, and is electrically connected with the common electrode on the opposing substrate through a conductive metal ball(s) in the sealant disposed between the display substrate and the opposing substrate in the display device.

Figure 13:
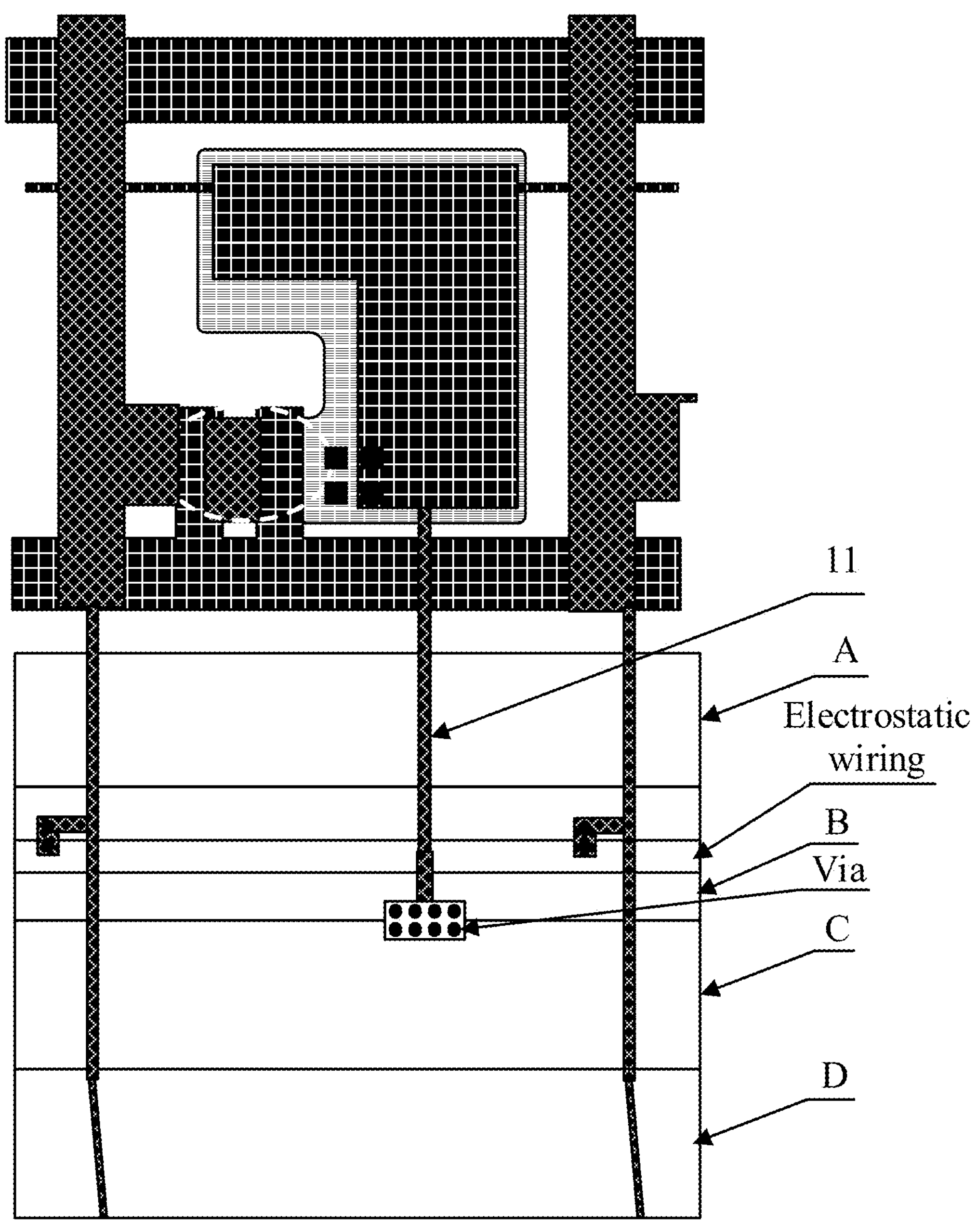
FIG. 13 illustrates a connection between a second block electrode and a common electrode line provided by an embodiment of the disclosure.

Please refer to FIG. 13 which shows a connection between a second block electrode and a common electrode line provided by an embodiment of the disclosure. The second block electrodes 10 are electrically connected through a common electrode line(s) 11 extending in the extension direction of the data line 3; and the orthographic projection of the bar structure 6 at least partially covers the orthographic projection(s) of the common electrode line(s) 11 or is in contact with the orthographic projection(s) of the common electrode line 11 on the base substrate 1.

The above-mentioned common electrode line 11 and second block electrode 10 are arranged in the same one layer and use the same material. The second block electrodes 10 in the extension direction of the data line 3 are electrically connected through the common electrode line 11 with the extension direction that is consistent with the extension direction of the data line 3, and the bar structure 6 at least covers part of the common electrode line(s) 11 or is in contact with the common electrode line 11. The common electrode line 11 extends into the non-display region along the extension direction of the data line 3 to receive the common signal. FIG. 13 shows in a bottom boundary of the display substrate, the non-display region between one sub-pixel region ara and the sector region including a boundary region A, an electrostatic dissipation region B, a common signal region C, a sector region D. A circle of boundary wiring(s) surrounding the display region of the display substrate is provided in the boundary region A, and its electric field is different from the electric field in the sub-pixel region ara, which is used to form a frame when the display device containing the above display substrate for display. An electrostatic wiring(s) is provided in the electrostatic dissipation region B, and the data line 3 is electrically connected with the electrostatic wiring through a via. Optionally, an electrostatic discharge circuit with one end connected with the data line and the other end connected with the electrostatic wiring, can be provided. Optionally, the electrostatic wiring can be connected with the common electrode line in the non-display region, which is not limited here. A common signal wiring(s) is provided in the common signal region C, and each column of second block electrodes 10 are electrically connected with the common signal wiring through the corresponding common electrode line 11, and then the common signal wiring is electrically connected with the common electrode on the opposing substrate by using the conductive metal balls (not shown in FIG. 13) in the sealant between the display substrate and the opposing substrate to allow the second block electrode 10 and the common electrode to be loaded with the same common voltage.

Figure 14:
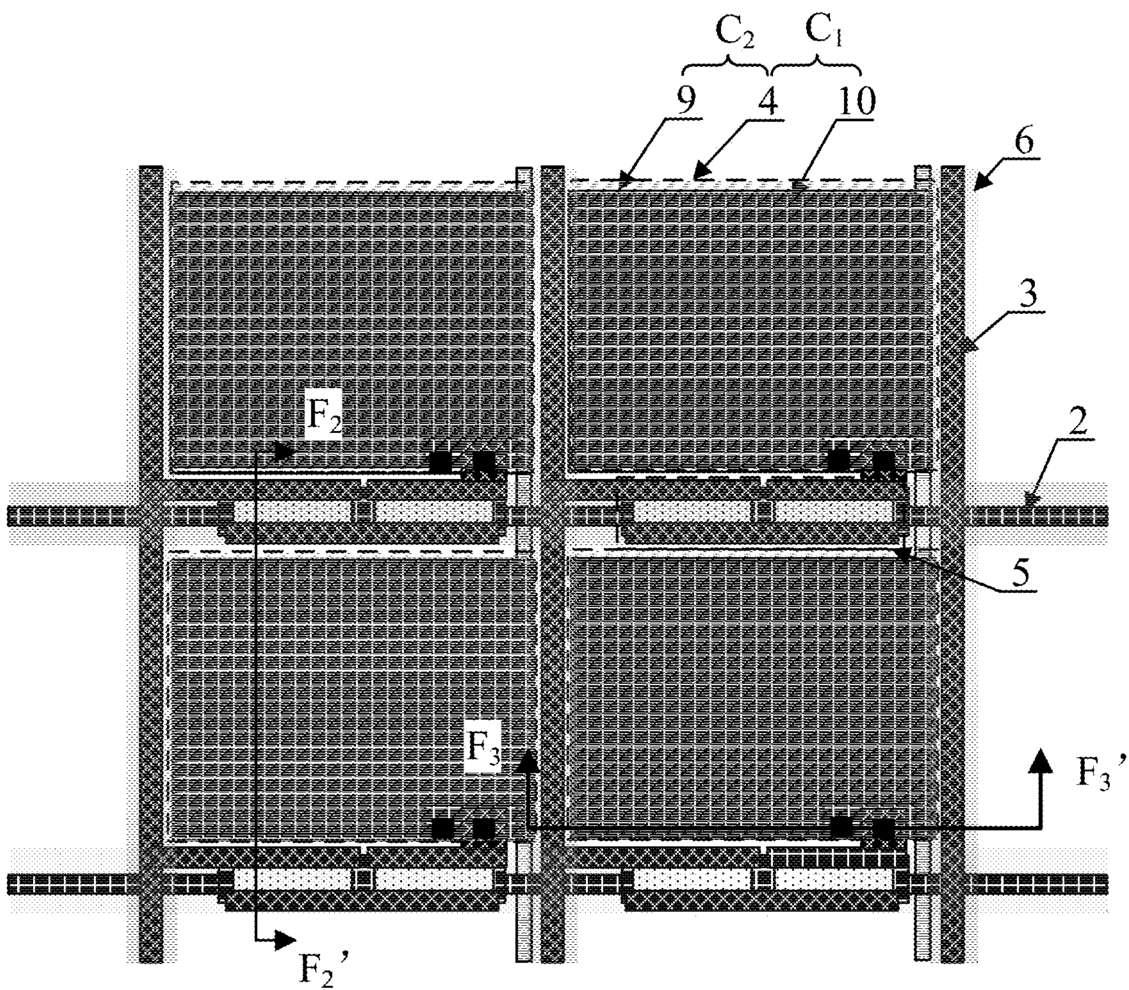
FIG. 14 is a top view of a part of sub-pixel regions of another display substrate provided by an embodiment of the disclosure.
Figure 15:
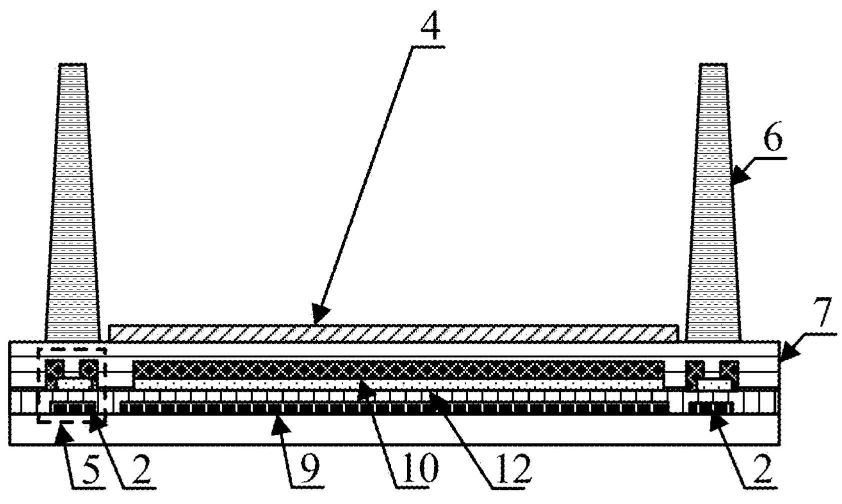
FIG. 15 is a cross-sectional view in a direction $F_2F_2'$ in FIG. 14 provided by an embodiment of the disclosure.
Figure 16:
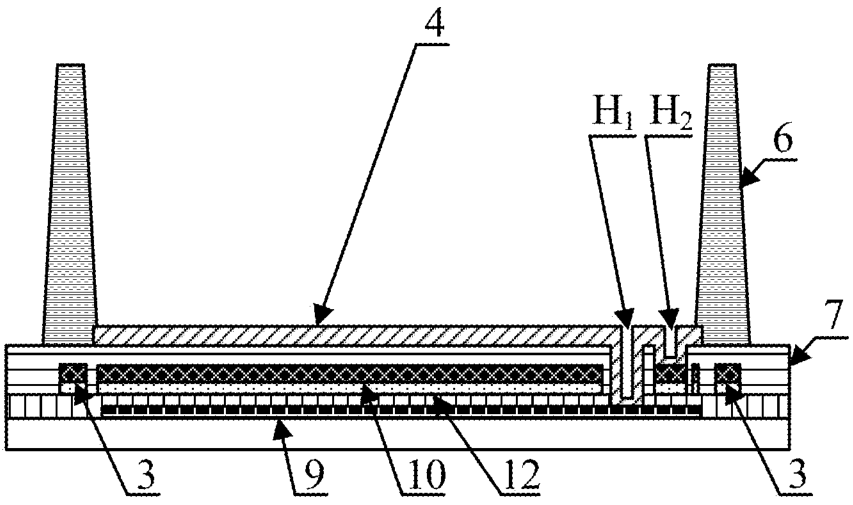
FIG. 16 is a cross-sectional view in a direction $F_3F_3'$ in FIG. 14 provided by an embodiment of the disclosure.

Please refer to FIGS. 14 to 16. FIG. 14 is a top view of a part of sub-pixel regions of another display substrate provided by an embodiment of the disclosure. FIG. 15 is a cross-sectional view along the direction $F_2F_2'$ in FIG. 14 provided by an embodiment of the disclosure. FIG. 16 is a cross-sectional view in the direction $F_3F_3'$ in FIG. 14 provided by an embodiment of the disclosure.

FIG. 14 corresponds to the solution in which the sub-pixel electrode 4 does not cover the driving transistor 5 and the gate of the driving transistor 5 reuses the gate line 2. The first block electrodes 9 are provided in the gate metal layer and the second block electrodes 10 are provided in the source-drain metal layer, in this way, the sub-pixel electrode 4 and the second block electrode 10 form the first storage capacitor C1, and the second block electrode 10 and the first block electrode 9 form the second storage capacitor C2, so that the first block electrode 9, the second block electrode 10, and the sub-pixel electrode 4 can be utilized to form a double storage capacitor, which make the pixel voltage in the sub-pixel region ara not power down quickly, thereby fully driving the electronic slurry and charged particles accommodated in the opening region of the bar structure 6. FIGS. 15 and 16 are cross-sectional views along the directions $F_2F_2'$ and $F_3F_3'$ in FIG. 14 respectively. The above-mentioned first block electrode 9 is electrically connected with the sub-pixel electrode 4 through the first via to load the pixel voltage, and the second block electrode 10 is electrically connected with the common voltage signal line through the via around the display region of the display substrate to load the common voltage, and is electrically connected with the common electrode on the opposing substrate through a conductive metal ball(s) in the sealant disposed between the display substrate and the opposing substrate in the display device.

Figure 17:
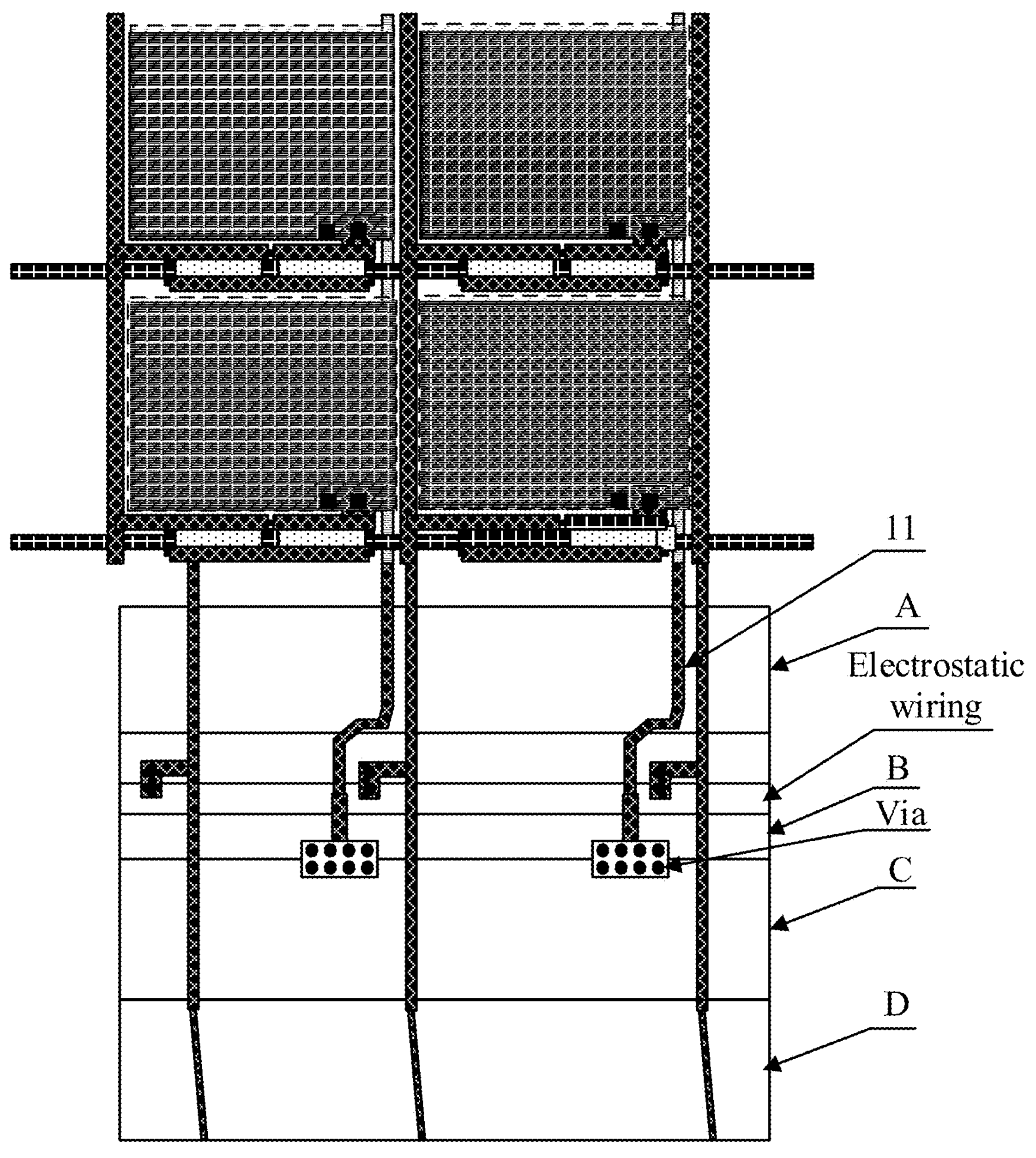
FIG. 17 illustrates another connection between a second block electrode and a common electrode line provided by an embodiment of the disclosure.

Please refer to FIG. 17 which illustrates another connection between a second block electrode and a common electrode line provided by an embodiment of the disclosure. The second block electrodes 10 are electrically connected through a common electrode line(s) 11 with an extension direction consistent with the extension direction of the data line 3; and the orthographic projection of the bar structure 6 on the base substrate 1 at least partially covers the orthographic projections(s) of the common electrode line(s) 11 or is in contact with the orthographic projection(s) of the common electrode line 11.

The above-mentioned common electrode line 11 and second block electrode 10 are arranged in the same one layer and use the same material. The second block electrodes 10 in the extension direction of the data line 3 are electrically connected through the common electrode line 11 with the extension direction that is consistent with the extension direction of the data line 3, and the bar structure 6 at least covers part of the common electrode line(s) 11 or is in contact with the common electrode line 11. The common electrode line 11 extends into the non-display region along the extension direction of the data line 3 to receive the common signal. FIG. 17 shows a bottom boundary of the display substrate, in which a non-display region between one sub-pixel region ara and the sector region including a boundary region A, an electrostatic dissipation region B, a common signal region C, a sector region D. A circle of boundary wiring(s) surrounding the display region of the display substrate is provided in the boundary region A, and its electric field is different from the electric field in the sub-pixel region ara, which is used to form a frame when the display device containing the above display substrate for display. An electrostatic wiring(s) is provided in the electrostatic dissipation region B, and the data line 3 is electrically connected with the electrostatic wiring through a via. Optionally, an electrostatic discharge circuit with one end connected with the data line and the other end connected with the electrostatic wiring can be provided. Optionally, the electrostatic wiring can be connected with the common electrode line in the non-display region, which is not limited here. A common signal wiring(s) is provided in the common signal region C, and each column of the second block electrode s10 are electrically connected with the common signal wiring through the corresponding common electrode line 11, and then the common signal wiring is electrically connected with the common electrode on the opposing substrate through the conductive metal balls (not shown in FIG. 17) in the sealant between the display substrate and the opposing substrate to allow the second block electrode 10 and the common electrode to be loaded with the same common voltage.

It should be understood that since the first block electrode 9 and the second block electrode 10 in FIG. 14 and FIG. 17 almost overlap with each other, it is difficult to distinguish them, so please refer to FIG. 15 or FIG. 16. In FIG. 11, FIG. 14, and FIG. 17, in order to easily know that the first block electrode 9, the second block electrode 10 and the sub-pixel electrode 4 overlap, the drawing layers of the second block electrode 10 and the sub-pixel electrode 4 are set to a semi-transparent state, so it should not be understood that the above multiple drawing layers are superimposed to form one certain drawing layer.

Please continue to refer to FIG. 15 and FIG. 16. The base substrate further includes a semiconductor layer between the source-drain metal layer and the gate metal layer.

The semiconductor layer is in contact with the source-drain metal layer, and the semiconductor layer includes active layers of the driving transistors 5 and third block electrodes 12 whose pattern is consistent with the pattern of the second block electrodes 10. Here, the third block electrodes 12 and the semiconductor layers of the driving transistors 5 are set in the same one layer and made of the same material. During manufacture, the semiconductor layer can be deposited first, then the source-drain metal layer is deposited, and finally etched, which may allow the semiconductor layer and the source-drain metal layer to share the mask, thereby reducing the quantity of masks and achieving the purpose of saving processes.

Figure 18:
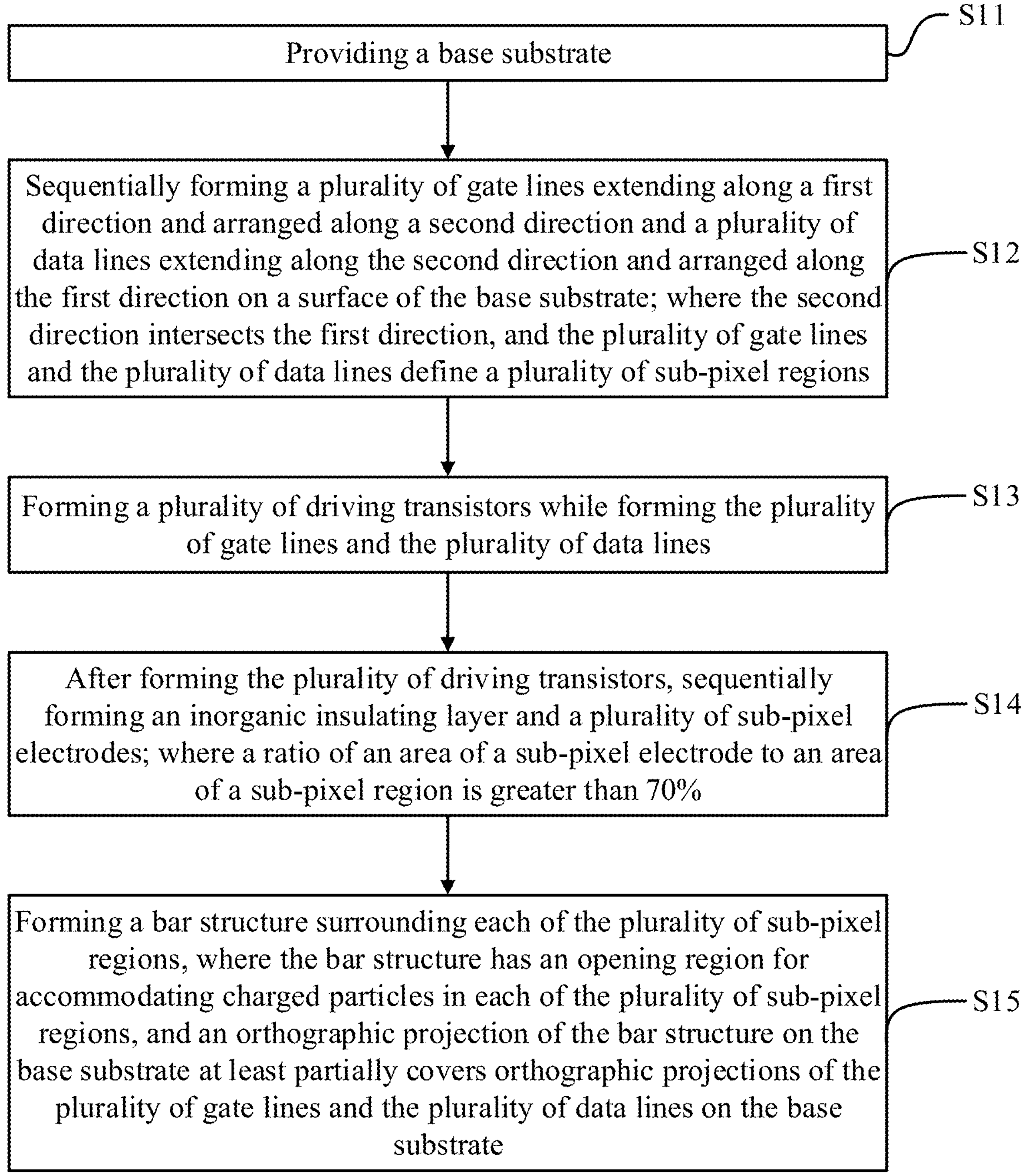
FIG. 18 is a flow chart of manufacturing a display substrate provided by an embodiment of the disclosure.

Based on the same inventive concept, an embodiment of the disclosure provides a manufacturing method for a display substrate. Please refer to FIG. 18, the manufacturing method includes:

- step S11: providing a base substrate;
- step S12: sequentially forming a plurality of gate lines extending along a first direction and arranged along a second direction as well as a plurality of data lines extending along the second direction and arranged along the first direction on a surface of the base substrate; where the second direction intersects the first direction, and the plurality of gate lines and the plurality of data lines define a plurality of sub-pixel regions;
- step S13: forming a plurality of driving transistors while forming the plurality of gate lines and the plurality of data lines;
- step S14: after forming the plurality of driving transistors, sequentially forming an inorganic insulating layer and a plurality of sub-pixel electrodes; where a ratio of an area of a sub-pixel electrode to an area of a sub-pixel region is greater than 70%; and
- step S15: forming a bar structure surrounding each of the plurality of sub-pixel regions, where the bar structure has an opening region for accommodating charged particles in each of the plurality of sub-pixel regions, and an orthographic projection of the bar structure on the base substrate at least partially covers orthographic projections of the plurality of gate lines and the plurality of data lines on the base substrate.

Figure 19:
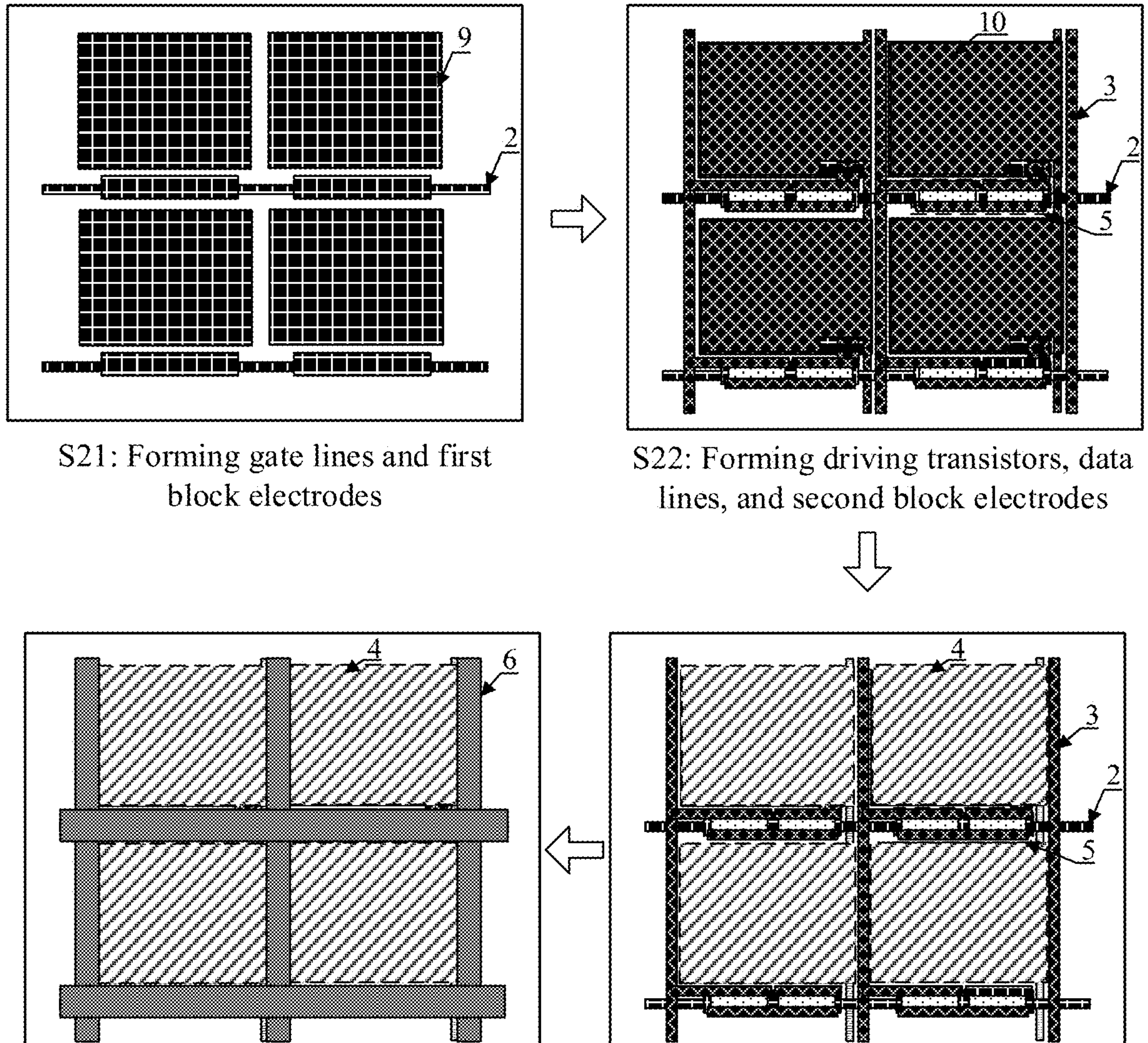
FIG. 19 is a schematic diagram of manufacturing a display substrate provided by an embodiment of the disclosure.

Please refer to FIG. 19 which is a schematic diagram of manufacturing a display substrate provided by an embodiment of the disclosure. FIG. 19 takes the manufacture of the display substrate of FIG. 14 as an example. The specific manufacturing process is as follows.

Step S21: forming gate lines and first block electrodes.

A gate metal layer is deposited on the base substrate 1, and the gate metal layer is etched to form the gate lines 2 and the first block electrodes 9. For a display substrate in which the sub-pixel electrodes 4 do not cover the driving transistors 5 and the gates of the driving transistors 5 reuse the gate lines 2, when the gate lines 2 are formed, for the portions of the gate lines 2 that are reused as the gates of the driving transistors 5, the widths of the corresponding portions of the gate line 2 needs to be increased during patterning, that is, the widths of the gate lines 2 formed in the regions where the gate lines 2 overlap the driving transistors 5 are greater than the widths of the gate lines in other regions.

Step S22: forming driving transistors, data lines, and second block electrodes.

The gate insulating layer, the semiconductor layer and the source-drain metal layer are sequentially deposited on the etched gate metal layer; and then, the source-drain metal layer and the semiconductor layer are etched to form the data lines 3 and the active layers, the sources and the drains of the driving transistors 5, as well as the second block electrodes 10 and/or the third block electrodes 12, thus the data lines 3 and the driving transistors 5 are formed, and the second block electrodes 10 and/or the third block electrode 12 are also formed.

Step S23: forming sub-pixel electrodes.

The inorganic insulating layer and the sub-pixel electrode layer are deposited on the etched source-drain metal layer, and the sub-pixel electrode layer is etched to form the sub-pixel electrodes 4.

Step S24: forming a bar structure.

A resin layer is deposited on the etched sub-pixel electrode layer, and the resin layer is etched to form the bar structure 6.

If a display substrate with the organic insulating layer 8 is manufactured, there is no need to widen the portions of the gate lines during the process of forming the gate lines in step S21, and after depositing the inorganic insulating layer in step S23, one thicker organic insulating layer (e.g., resin) needs to be deposited first, and then the sub-pixel electrode layer is deposited.

Figure 20:
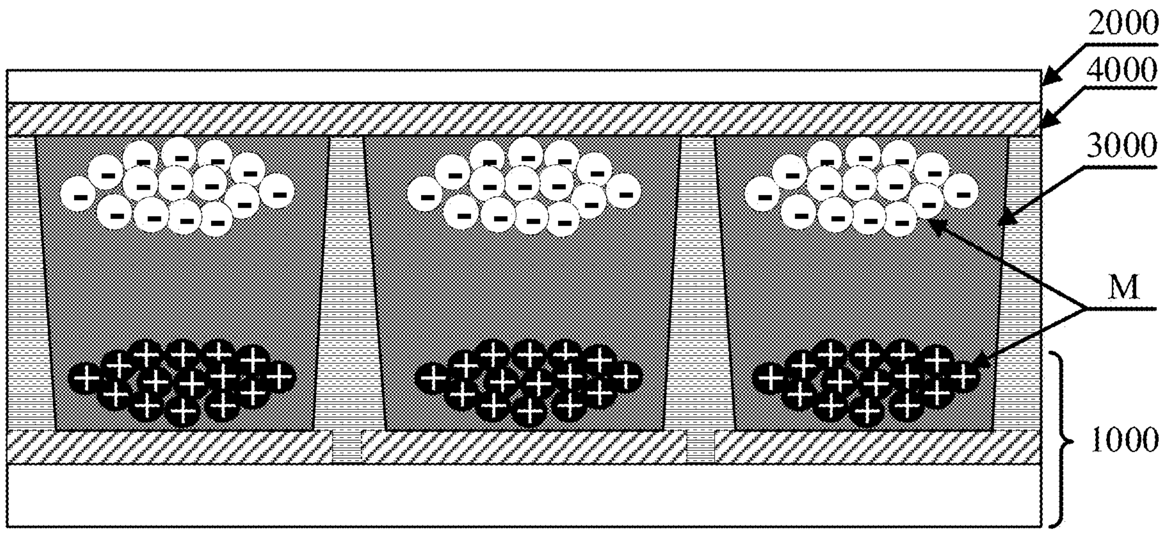
FIG. 20 is a schematic structural diagram of a display device provided by an embodiment of the disclosure.

Based on the same inventive concept, an embodiment of the disclosure provides a display device, as shown in FIG. 20. The display device includes:

the display substrate 1000 as mentioned above, an opposing substrate 2000 opposite to the display substrate 1000, an electronic slurry layer 3000 filled in each opening region of the bar structure, and a common electrode layer 4000 on a side of the opposing substrate 2000 facing the display substrate 1000; where the electronic slurry layer 3000 are provided with charged particles M of at least two colors inside.

The charged particles M of the two colors have opposite polarities. For example, one kind of charged particles M is negatively charged white particles, and the other kind of charged particle M is positively charged black particles.

Figure 21:
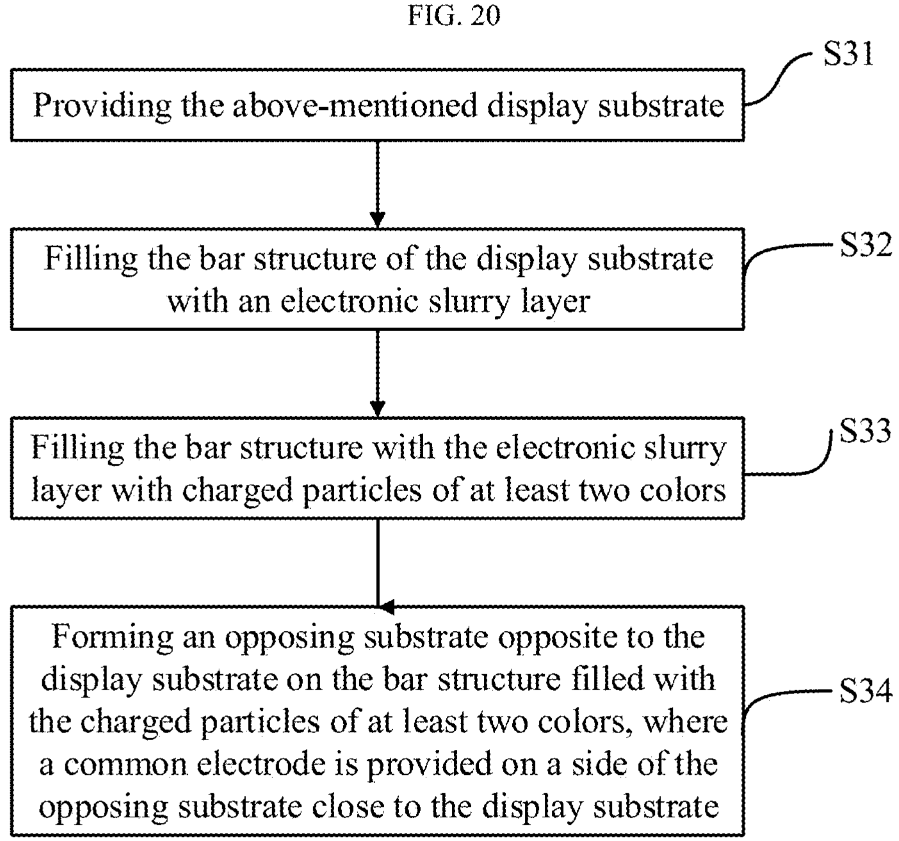
FIG. 21 is a flow chart of manufacturing a display device provided by an embodiment of the disclosure.

Based on the same inventive concept, an embodiment of the disclosure provides a manufacturing method for a display device, please refer to FIG. 21. The manufacturing method includes:

step S31: providing the above-mentioned display substrate;

step S32: filling the bar structure of the display substrate with an electronic slurry layer;

step S33: filling the bar structure with the electronic slurry layer with charged particles of at least two colors; and step S34: forming an opposing substrate opposite to the display substrate on the bar structure filled with charged particles of at least two colors, where a common electrode is provided on a side of the opposing substrate close to the display substrate.

Figure 22:
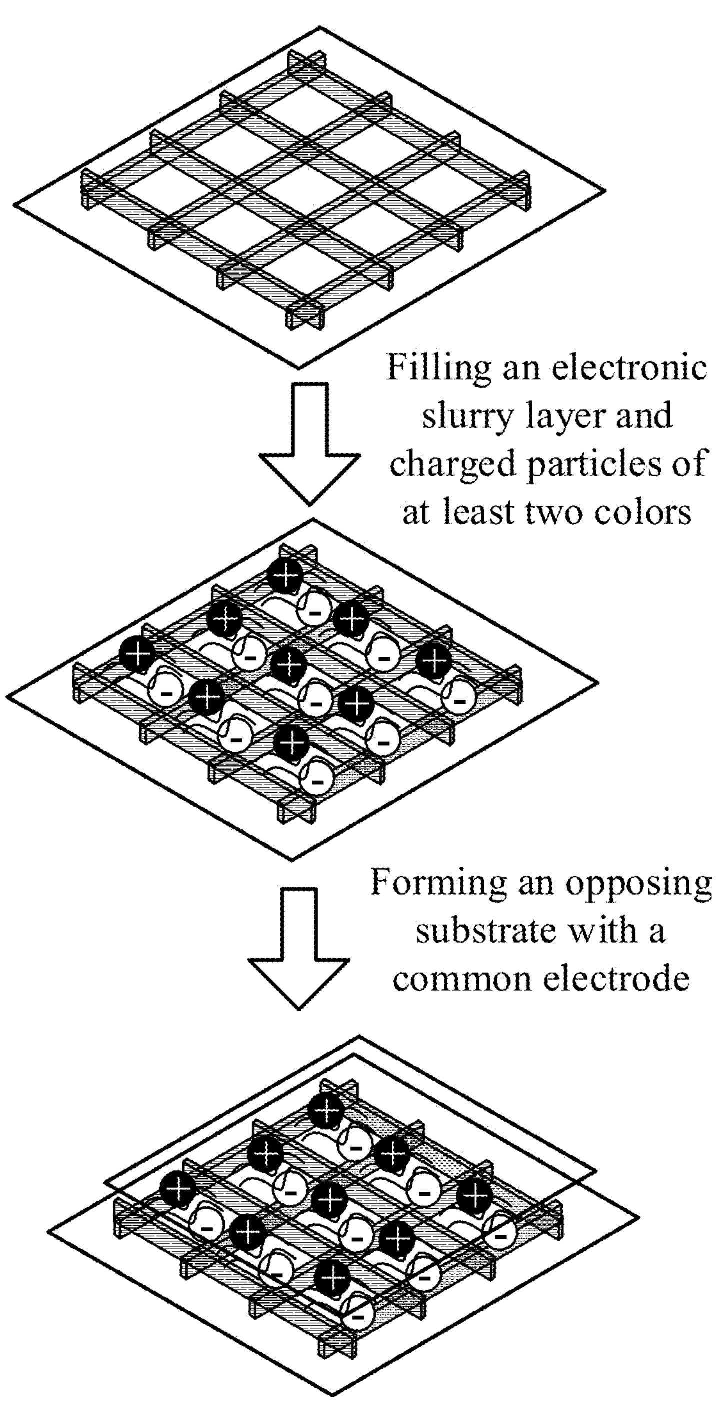
FIG. 22 is a manufacturing schematic diagram of a display device provided by an embodiment of the disclosure.

Please refer to FIG. 22 which is a schematic diagram of the display device provided by an embodiment of the disclosure.

The display substrate with the bar structure provided by the disclosure is filled with the electronic slurry layer and charged particles of at least two colors, and then the opposing substrate with the common electrode is formed and arranged opposite to the display substrate, thus forming the display device.

The display device can be an electronic paper product, such as an electronic ink screen, an electronic signage, an electronic price tag, an electronic work badge, etc.

Although the preferred embodiments of the disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the disclosure.

Obviously, those skilled in the art can make various changes and modifications to the disclosure without departing from the spirit and scope of the disclosure. In this way, if these modifications and variations of the disclosure fall within the scope of the claims of the disclosure and equivalent technologies, the disclosure is also intended to include these modifications and variations.

What is claimed is:

1. A display substrate, comprising:

a base substrate;

a plurality of gate lines disposed on the base substrate, extending along a first direction and arranged along a second direction;

a plurality of data lines disposed on the base substrate, extending along the second direction and arranged along the first direction; wherein the second direction intersects the first direction, and the plurality of gate lines and the plurality of data lines define a plurality of sub-pixel regions;

a plurality of sub-pixel electrodes in the plurality of sub-pixel regions on the base substrate;

a plurality of driving transistors disposed on the base substrate and electrically connected with the plurality of data lines, the plurality of gate lines and the plurality of sub-pixel electrodes; and a bar structure on a side of a layer where the plurality of sub-pixel electrodes are located away from the base substrate, wherein the bar structure has an opening region for accommodating charged particles in each of the plurality of sub-pixel regions, an orthographic projection of the bar structure on the base substrate at least partially covers orthographic projections of the plurality of gate lines and the plurality of data lines on the base substrate, and a ratio of an area of the sub-pixel electrode to an area of the sub-pixel region is greater than 70%.

2. The display substrate according to claim 1, wherein the bar structure comprises: first bars extending along the first direction and arranged along the second direction, and second bars extending along the second direction and arranged along the first direction; and an orthographic projection of the first bar at least partially covers the orthographic projection of the gate line on the base substrate, and an orthographic projection of the second bar at least partially covers the orthographic projection of data line and has an overlapping region with the orthographic projection of the sub-pixel electrode on the base substrate.

3. The display substrate according to claim 2, wherein a cross section of the first bar along the second direction and a cross section of the second bar along the first direction both are trapezoid shaped.

4. The display substrate according to claim 3, wherein a ratio of a top side to a bottom side of the trapezoid ranges from 0.5 to 0.8.

5. The display substrate according to claim 1, further comprising: a first block electrode and a second block electrode stacked in each of the plurality of sub-pixel regions on the base substrate;

the first block electrode, a gate of the driving transistor and the gate line are all disposed in a gate metal layer;

the second block electrode and a source and a drain of the driving transistor are all disposed in a source-drain metal layer;

the source-drain metal layer is located between the gate metal layer and the layer where the plurality of sub-pixel electrodes are located; and a first storage capacitor is formed between the sub-pixel electrode and the second block electrode, and a second storage capacitor is formed between the second block electrode and the first block electrode.

6. The display substrate according to claim 5, wherein in the opening region of the bar structure, the sub-pixel electrode is electrically connected with a first block electrode through a first via, and the sub-pixel electrode is electrically connected with the source of the driving transistor through a second via.

7. The display substrate according to claim 5, wherein second block electrodes are electrically connected through a common electrode line extending in the second direction; and the orthographic projection of the bar structure at least partially covers an orthographic projection of the common electrode line or is in contact with the orthographic projection of the common electrode line on the base substrate.

8. The display substrate according to claim 1, further comprising: an inorganic insulating layer between a layer where the plurality of driving transistors are located and the layer where the plurality of sub-pixel electrodes are located; and the orthographic projection of the sub-pixel electrode covers the orthographic projection of the driving transistor on the base substrate, an organic insulating layer is provided between the inorganic insulating layer and the layer where the plurality of sub-pixel electrodes are located, and a thickness of the organic insulating layer is greater than a thickness of the inorganic insulating layer.

9. The display substrate according to claim 1, wherein the orthographic projection of the driving transistor does not overlap the orthographic projection of the sub-pixel electrode on the base substrate, and the orthographic projection of the driving transistor overlaps the orthographic projection of the gate line and is located between orthographic projections of two data lines on the base substrate; and a line width of the gate line in a region where the orthographic projection of the gate line overlaps the orthographic projection of the driving transistor is greater than a line width of the gate line in other regions.

10. The display substrate according to claim 9, further comprising: a semiconductor layer between the source-drain metal layer and the gate metal layer; and the semiconductor layer is in contact with the source-drain metal layer, and the semiconductor layer comprises active layers of the plurality of driving transistors, and third block electrodes with a pattern consistent with a pattern of the second block electrodes.

11. The display substrate according to claim 8, wherein a material of the organic insulating layer and a material of the bar structure are both resin.

12. A manufacturing method for a display substrate, comprising:

providing a base substrate;

sequentially forming a plurality of gate lines extending along a first direction and arranged along a second direction as well as a plurality of data lines extending along the second direction and arranged along the first direction on a surface of the base substrate; wherein the second direction intersects the first direction, and the plurality of gate lines and the plurality of data lines define a plurality of sub-pixel regions;

forming a plurality of driving transistors while forming the plurality of gate lines and the plurality of data lines;

after forming the plurality of driving transistors, sequentially forming an inorganic insulating layer and a plurality of sub-pixel electrodes; wherein a ratio of an area of a sub-pixel electrode to an area of a sub-pixel region is greater than 70%; and forming a bar structure surrounding each of the plurality of sub-pixel regions, wherein the bar structure has an opening region for accommodating charged particles in each of the plurality of sub-pixel regions, and an orthographic projection of the bar structure on the base substrate at least partially covers orthographic projections of the plurality of gate lines and the plurality of data lines on the base substrate.

13. The manufacturing method according to claim 12, wherein when an orthographic projection of the sub-pixel electrode covers an orthographic projection of the driving transistor on the base substrate, the manufacturing method further comprises:

after forming the inorganic insulating layer and before forming the plurality of sub-pixel electrodes, forming an organic insulating layer with a thickness greater than a thickness of the inorganic insulating layer.

14. The manufacturing method according to claim 12, wherein when an orthographic projection of the sub-pixel electrode does not overlap an orthographic projection of the driving transistor on the base substrate, the forming the plurality of gate Lines comprises:

forming the plurality of gate lines with a width in a region where orthographic projections of the gate lines overlap orthographic projections of the driving transistors greater than a width of the gate lines in other regions.

15. A display device, comprising:

the display substrate according to claim 1;

an opposing substrate opposite to the display substrate;

an electronic slurry layer filled in each opening region of the bar structure; and a common electrode layer on a side of the opposing substrate facing the display substrate;

wherein the electronic slurry layer are provided with charged particles of at least two colors inside.

16. A manufacturing method for a display device, comprising:

providing the display substrate according to claim 1;

filling the bar structure of the display substrate with an electronic slurry layer;

filling the bar structure with the electronic slurry layer with charged particles of at least two colors; and forming an opposing substrate opposite to the display substrate on the bar structure filled with the charged particles of at least two colors;

wherein a common electrode is provided on a side of the opposing substrate close to the display substrate.

* * * * *